(12) United States Patent
Muller et al.

(10) Patent No.: US 8,280,827 B2
(45) Date of Patent: Oct. 2, 2012

(54) MULTILEVEL SEMIOTIC AND FUZZY LOGIC USER AND METADATA INTERFACE MEANS FOR INTERACTIVE MULTIMEDIA SYSTEM HAVING COGNITIVE ADAPTIVE CAPABILITY

(75) Inventors: Myrian Muller, Bevaix (CH); Joseph Hess, Bevaix (CH)

(73) Assignee: Syneola Luxembourg SA, Dudelange (LU)

( * ) Notice: Subject to any disclaimer, the term of this patent is extended or adjusted under 35 U.S.C. 154(b) by 792 days.

(21) Appl. No.: 12/064,726

(22) PCT Filed: Aug. 17, 2006

(86) PCT No.: PCT/EP2006/008112
§ 371 (c)(1),
(2), (4) Date: Oct. 1, 2008

(87) PCT Pub. No.: WO2007/022911
PCT Pub. Date: Mar. 1, 2007

(65) Prior Publication Data
US 2009/0132441 A1  May 21, 2009

(30) Foreign Application Priority Data
Aug. 23, 2005  (EP) .................................... 05018222

(51) Int. Cl.
*G06F 17/20* (2006.01)
*G06F 3/00* (2006.01)
*G05B 13/02* (2006.01)
(52) U.S. Cl. ............................. 706/11; 715/762; 700/50
(58) Field of Classification Search .................... 706/11; 715/762; 700/50
See application file for complete search history.

(56) References Cited

U.S. PATENT DOCUMENTS

| | | |
|---|---|---|
| 886,172 A | 4/1908 | Bevans |
| 5,447,439 A | 9/1995 | Nathanson |
| 5,618,180 A | 4/1997 | Nathanson |
| 5,632,009 A | 5/1997 | Rao et al. |
| 5,636,995 A | 6/1997 | Sharpe, III et al. |

(Continued)

FOREIGN PATENT DOCUMENTS
EP  0748482  12/1996
(Continued)

OTHER PUBLICATIONS

Definition of term "graphical user interface", downloaded from "http://www.webopedia.com/TERM/G/Graphical_User_Interface_GUI.html" on Jun. 20, 2011.

(Continued)

*Primary Examiner* — Mohammad Ali
*Assistant Examiner* — Sivalingam Sivanesan
(74) *Attorney, Agent, or Firm* — Griffin & Szipl, P.C.

(57) ABSTRACT

A multilevel semiotic and fuzzy logic user and metadata interface means includes: an interactive user interface means comprising at least one multilevel semiotic means addressable by a user and a fuzzy logic descriptor set module for storing multiple fuzzy logic descriptor sets; a metadata layer for linking said multilevel semiotic means to interactivity points present in content of the multimedia representation and defined by the metadata layer such that each level of each of the multilevel semiotic means identifies an interactivity point in the content and allows by selection of the interactivity point to perform a selectively varying content manipulation and to receive a resulting interactive presentation of content according to the selection: and a user control device for addressing the multilevel semiotic means.

47 Claims, 8 Drawing Sheets

U.S. PATENT DOCUMENTS

| | | | |
|---|---|---|---|
| 5,684,715 A | 11/1997 | Palmer | |
| 5,844,557 A | 12/1998 | Shively, II | |
| 5,929,849 A * | 7/1999 | Kikinis | 725/113 |
| 6,010,405 A | 1/2000 | Morawiec | |
| 6,116,907 A * | 9/2000 | Baker et al. | 434/156 |
| 6,154,771 A | 11/2000 | Rangan et al. | |
| 6,253,238 B1 | 6/2001 | Lauder et al. | |
| 6,275,817 B1 * | 8/2001 | Reed et al. | 706/45 |
| 6,394,263 B1 * | 5/2002 | McCrory | 706/47 |
| 6,400,996 B1 | 6/2002 | Hoffberg et al. | |
| 6,411,724 B1 | 6/2002 | Vaithilingam et al. | |
| 6,418,424 B1 | 7/2002 | Hoffberg et al. | |
| 6,426,761 B1 * | 7/2002 | Kanevsky et al. | 715/788 |
| 6,462,763 B1 | 10/2002 | Mostyn | |
| 6,496,981 B1 | 12/2002 | Wistendahl et al. | |
| 6,523,046 B2 | 2/2003 | Liu et al. | |
| 6,554,679 B1 | 4/2003 | Shackelford et al. | |
| 6,570,587 B1 | 5/2003 | Efrat et al. | |
| 6,584,470 B2 * | 6/2003 | Veale | 1/1 |
| 6,625,315 B2 | 9/2003 | Laumeyer et al. | |
| 6,636,242 B2 * | 10/2003 | Bowman-Amuah | 715/764 |
| 6,663,393 B1 | 12/2003 | Ghaly | |
| 6,669,564 B1 | 12/2003 | Young et al. | |
| 6,693,649 B1 | 2/2004 | Lipscomb et al. | |
| 6,733,383 B2 | 5/2004 | Busse et al. | |
| 6,748,382 B1 | 6/2004 | Mohan et al. | |
| 6,774,908 B2 | 8/2004 | Bates et al. | |
| 6,834,280 B2 * | 12/2004 | Auspitz et al. | 1/1 |
| 6,850,252 B1 | 2/2005 | Hoffberg | |
| 7,721,218 B2 * | 5/2010 | Awe et al. | 715/762 |
| 2001/0054150 A1 | 12/2001 | Levy | |
| 2002/0100063 A1 | 7/2002 | Herigstad et al. | |
| 2002/0112237 A1 * | 8/2002 | Kelts | 725/39 |
| 2002/0124004 A1 | 9/2002 | Reed et al. | |
| 2002/0161909 A1 | 10/2002 | White | |
| 2003/0085887 A1 | 5/2003 | Hunt et al. | |
| 2003/0179824 A1 | 9/2003 | Kan et al. | |
| 2003/0180700 A1 | 9/2003 | Barry et al. | |
| 2003/0187950 A1 | 10/2003 | Rising, III | |
| 2004/0148636 A1 | 7/2004 | Weinstein et al. | |
| 2005/0033760 A1 | 2/2005 | Fuller et al. | |
| 2005/0132420 A1 | 6/2005 | Howard et al. | |

FOREIGN PATENT DOCUMENTS

| | | |
|---|---|---|
| EP | 1 304 876 A2 | 4/2003 |
| EP | 0 941 607 B1 | 9/2004 |
| EP | 1 231 544 A3 | 12/2004 |
| JP | 2001-086434 | 3/2001 |
| JP | 2003-256432 | 9/2003 |
| JP | 2004-153782 | 5/2004 |
| WO | 95/24013 | 9/1995 |
| WO | 97/32200 | 9/1997 |
| WO | 99/00979 | 1/1999 |
| WO | 00/45294 | 8/2000 |
| WO | 00/70489 | 11/2000 |
| WO | 01/10118 A1 | 2/2001 |
| WO | 01/14032 A1 | 3/2001 |
| WO | 01/33327 A1 | 5/2001 |
| WO | 01/46910 A1 | 6/2001 |
| WO | 01/69369 A1 | 9/2001 |
| WO | 02/47013 A2 | 6/2002 |
| WO | 02/058383 A1 | 7/2002 |
| WO | 02092184 A1 | 11/2002 |
| WO | 03/041393 A2 | 5/2003 |
| WO | 03/071807 A1 | 8/2003 |
| WO | 03/075575 A1 | 9/2003 |
| WO | 2004/046199 A2 | 6/2004 |
| WO | 2004047080 A2 | 6/2004 |
| WO | 2004/057438 A2 | 7/2004 |
| WO | 2004/088664 A2 | 10/2004 |
| WO | 2004004919 A2 | 10/2004 |
| WO | 2004049199 A2 | 10/2004 |
| WO | 2004/102285 A2 | 11/2004 |
| WO | 2004/102522 A1 | 11/2004 |
| WO | 2005/008993 A1 | 1/2005 |
| WO | 2005/040991 A2 | 5/2005 |

OTHER PUBLICATIONS

International Search Report issued in corresponding International Application No. PCT/EP/2006/008112.

Wittig, H., et al., "Intelligent Media Agents in Interactive Television Systems," Proceedings of the International Conference on Multimedia Computing and Systems, Los Alamitos, CA, (1995), pp. 182-189.

Kohout, L.J., et al., "Semiotic Descriptors in Fuzzy Relational Computations," Proceedings of the 1998 IEEE International Symposium on Intelligent Control (ISIC) Held Jointly with IEEE International Symposium on Computational Intelligence in Robotics and Automation (CIRA) Intelligent Systems and Semiotics (ISAS), (1998), pp. 828-833.

Del Bimbo, A., "Expressive Semantics for Automatic Annotation and Retrieval of Video Streams," 2000 IEEE International Conference on Multimedia and Expo. ICME2000. Proceedings. Latest Advances in the Fast Changing World of Multimedia, IEEE Piscataway, N.J., vol. 2, (2000), pp. 671-674.

Kjeldskov, J., "Just-in-Place Information for Mobile Device Interfaces," Lecture Notes in Computer Science, Springer Verlag, NY, NY, vol. 2411 (2002), pp. 271-275.

The CD-I Design Handbook (Philips Electronics UK Ltd. 1992), pp. 12-13, 16-17, 32-35.

Brennan, John, "Crypts of Terror" (1984).

Zadeh, L.A., "Fuzzy Sets", Information and Control 8, p. 338-353 (1965) (equivalent to Zadeh, L.A., "Fuzzy Sets", Information and Control 8, p. 45-67 (1965).

Moriarity, Sandra, "Visual Semiotics and the Production of Meaning in Advertising", Visual Communication Division of AEJMC (1995), downloaded from http:spot.colorado.edu/-moriarts/vissemiotics.html on Jun. 18, 2011.

Mounin, George, "Clefs pour la Linguistique", Paris, p. 148-151 (1968).

Buckland, Warren, "The Cognitive Semiotics of Film", Cambridge University Press (2000).

"Dublin Core Metadata Initiative" at http://dublincore.org, downloaded on Jun. 18, 2011.

"Broadband Bananas—Interactive Advertising", dowloaded from www.broadbandbananas.com/content/blog on Jun. 18, 2011.

Definition of terms "interface" and "user interface", Computer Professionals Dictionary, Osborne-McGraw Hill, pp. 168, 169, 193, 336 (1990).

Definition of term "graphical user interface", downloaded from "http://www.webopedia.com/Term/G/Graphical_Userinterface_GUI.html" on Jun. 20, 2011.

\* cited by examiner

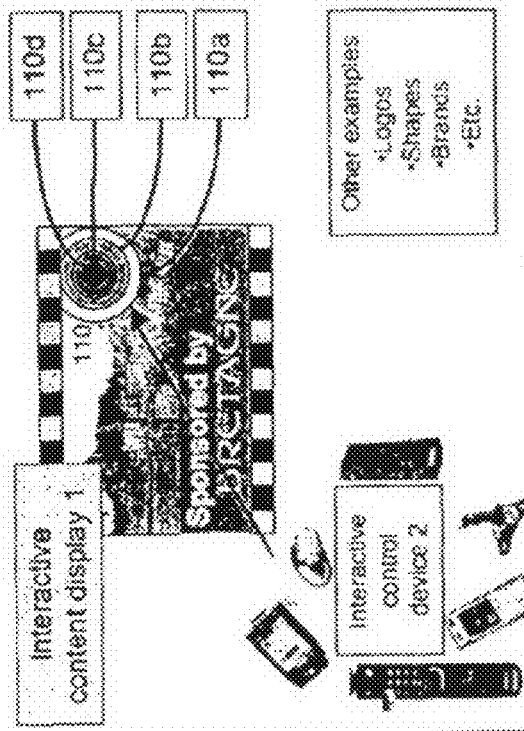
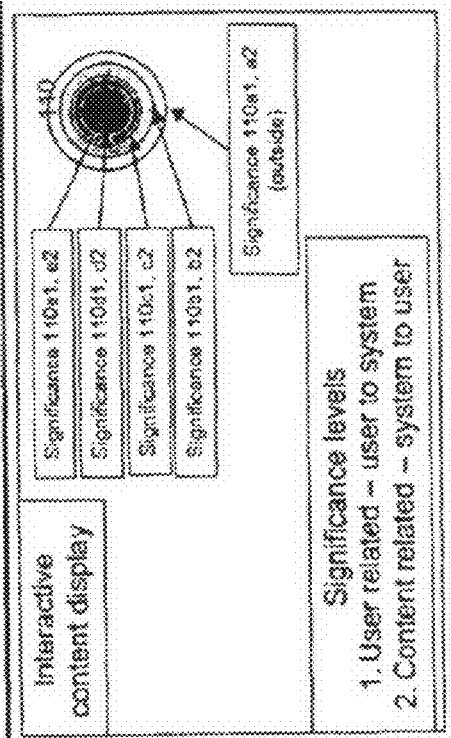
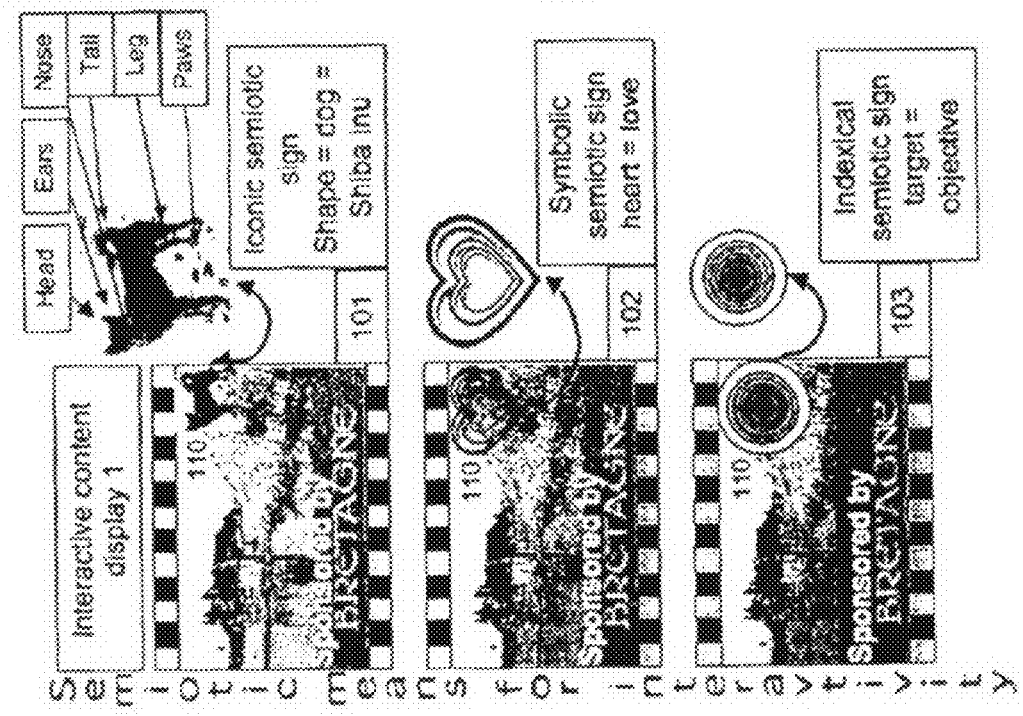

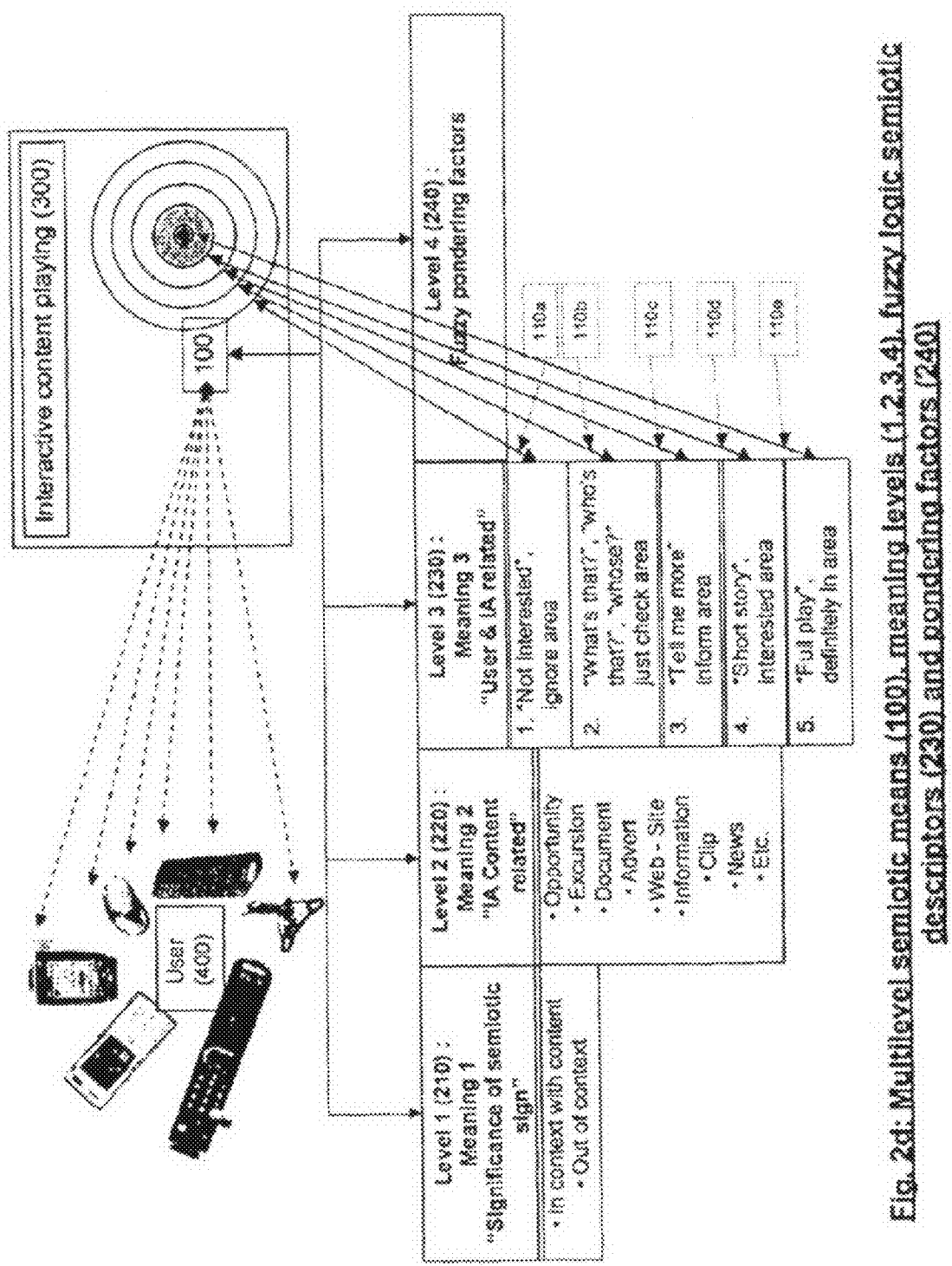

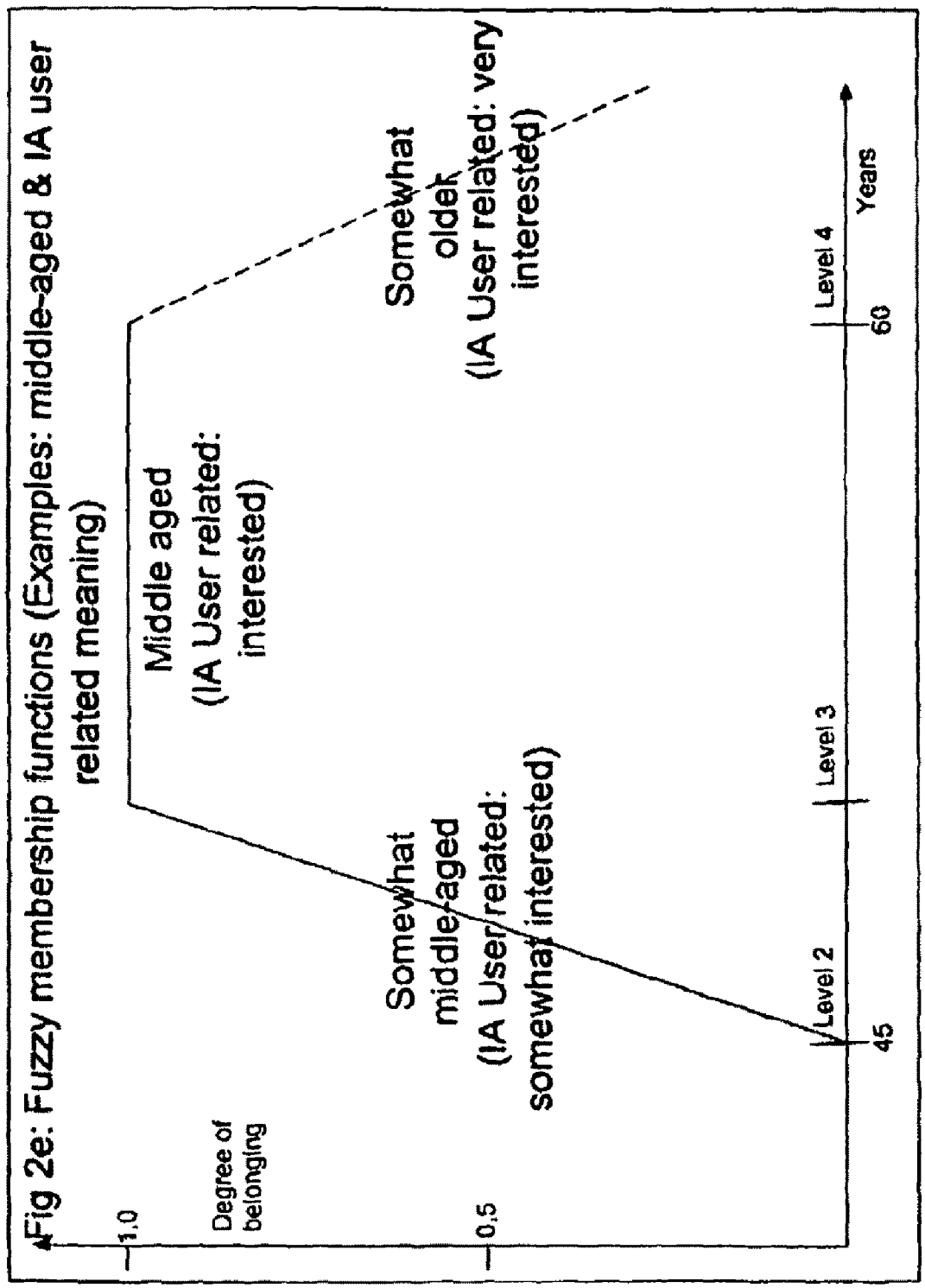

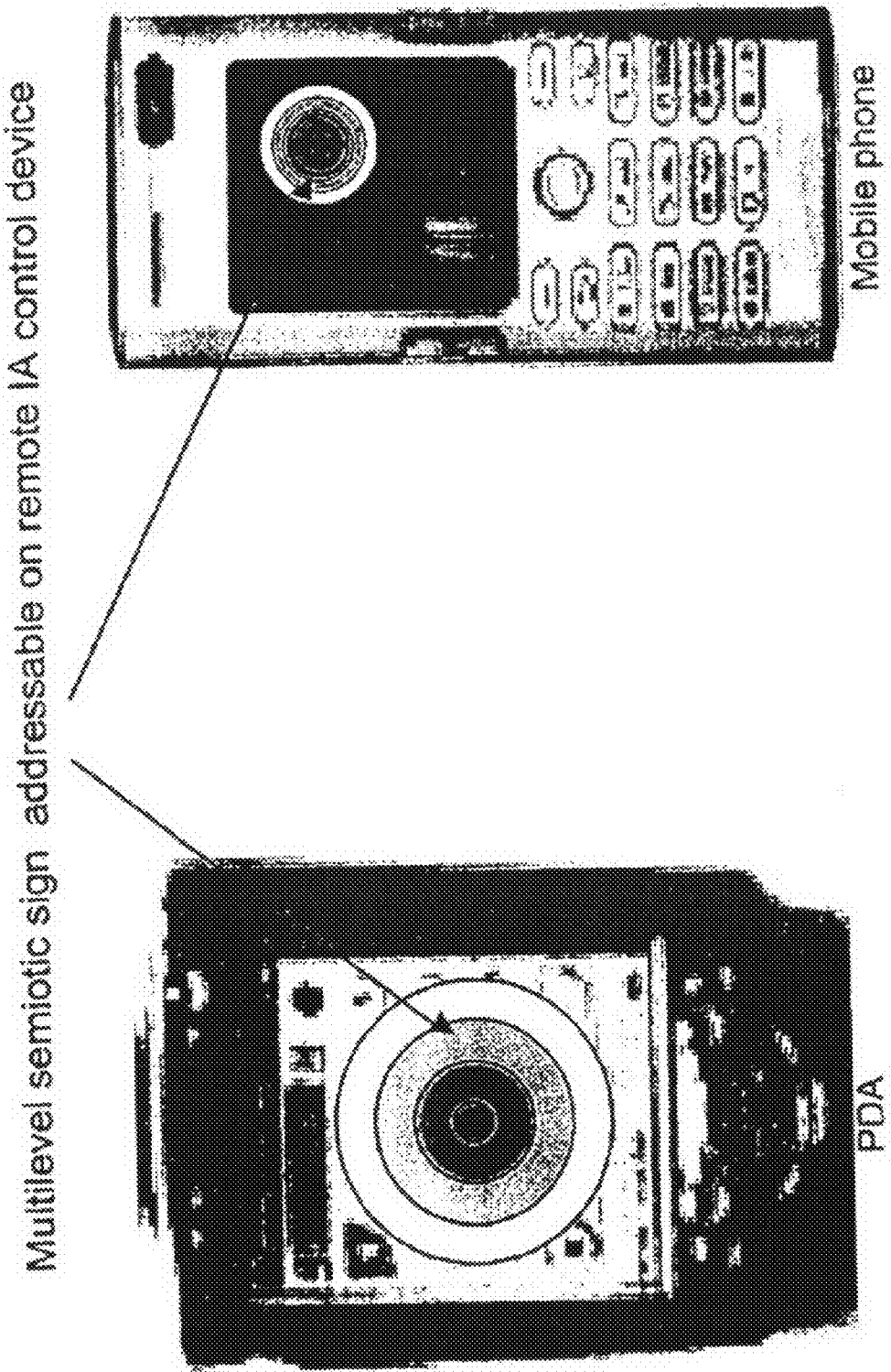
Fig 2f: Multilevel semiotic sign, IA addressing over control device

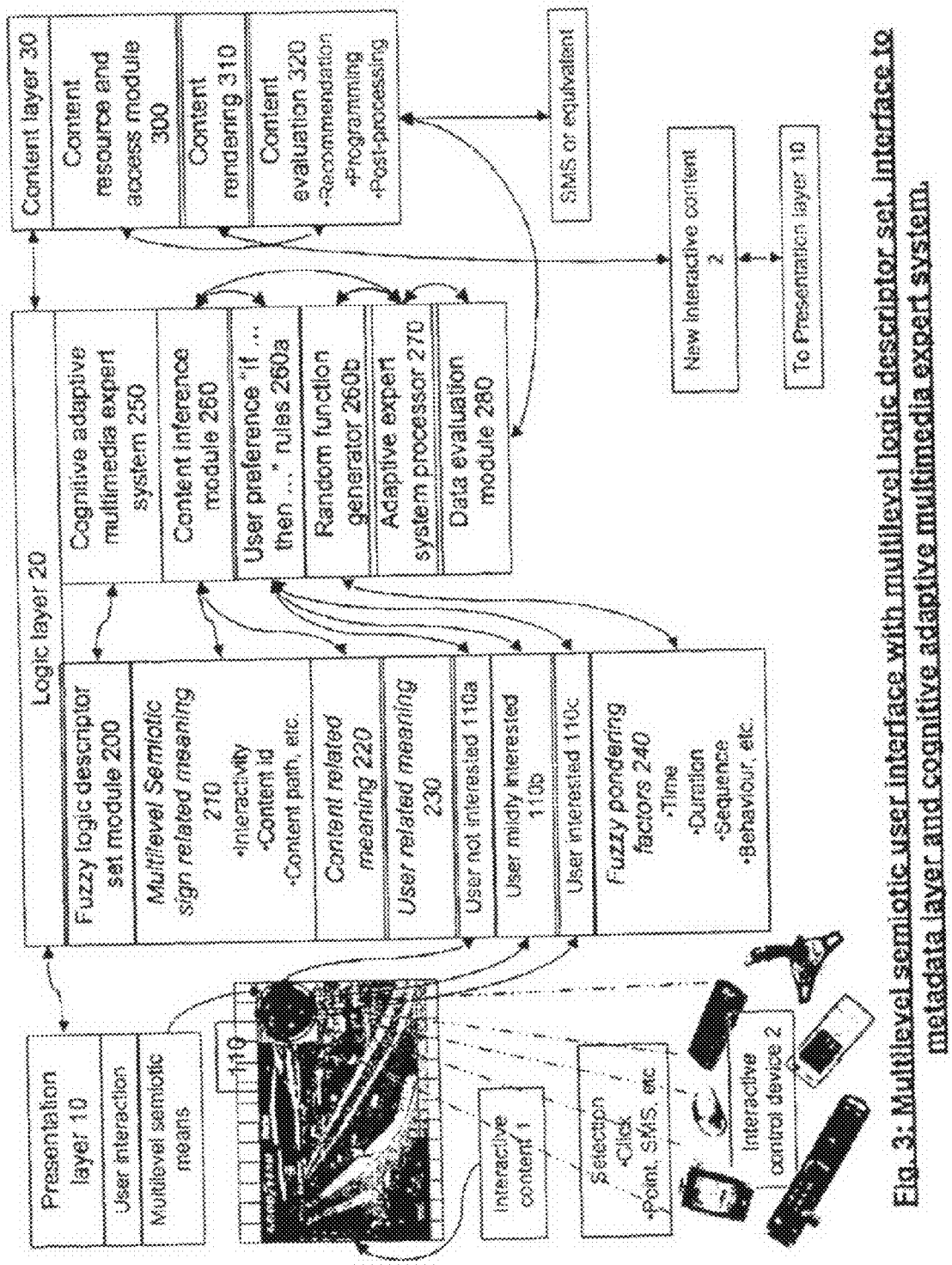
Fig. 3: Multilevel semiotic user interface with multilevel logic descriptor set interface to metadata layer and cognitive adaptive multimedia expert system.

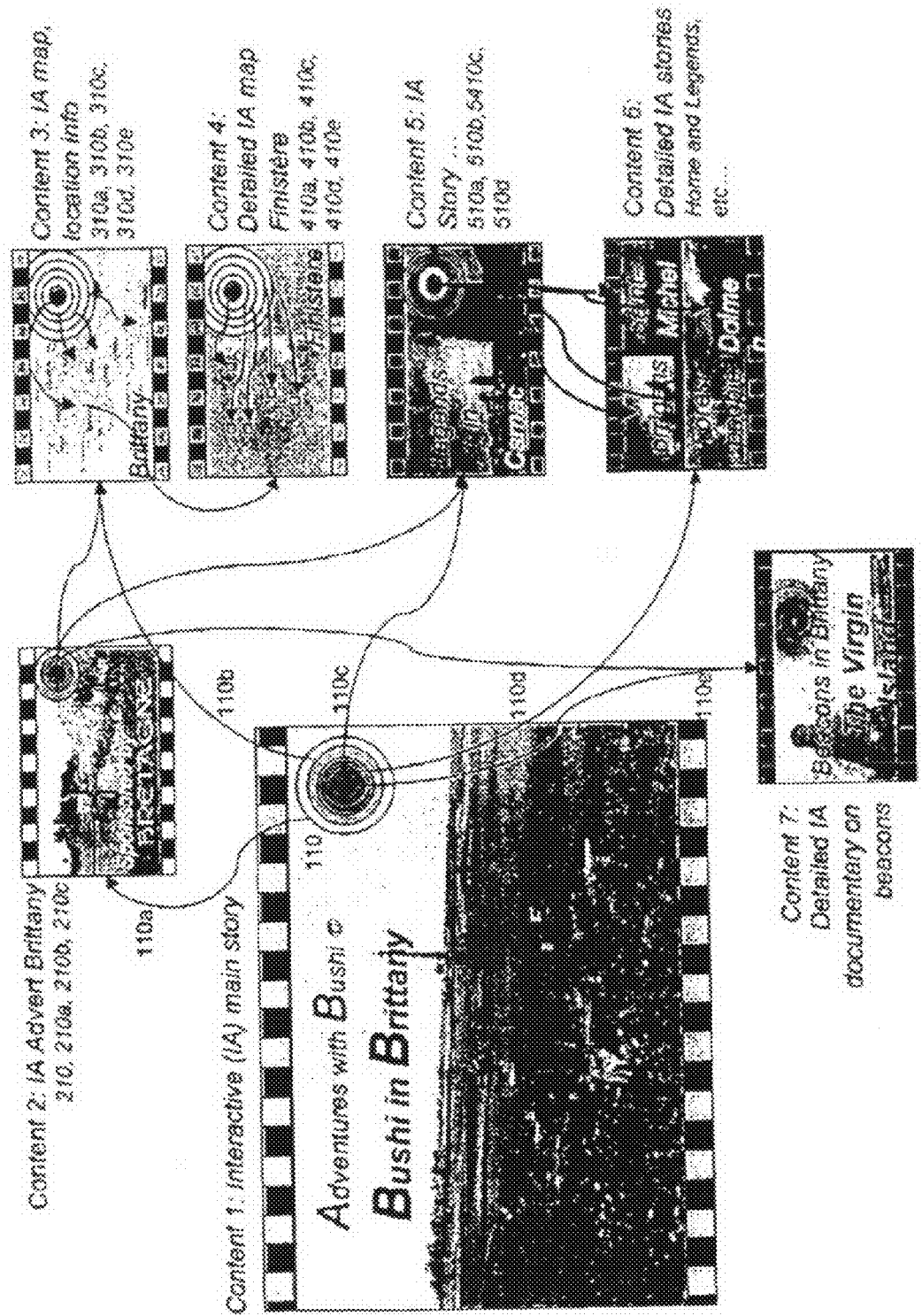
Fig. 4. Multilevel semiotic interactive user interface for interactive documentary & gaming content

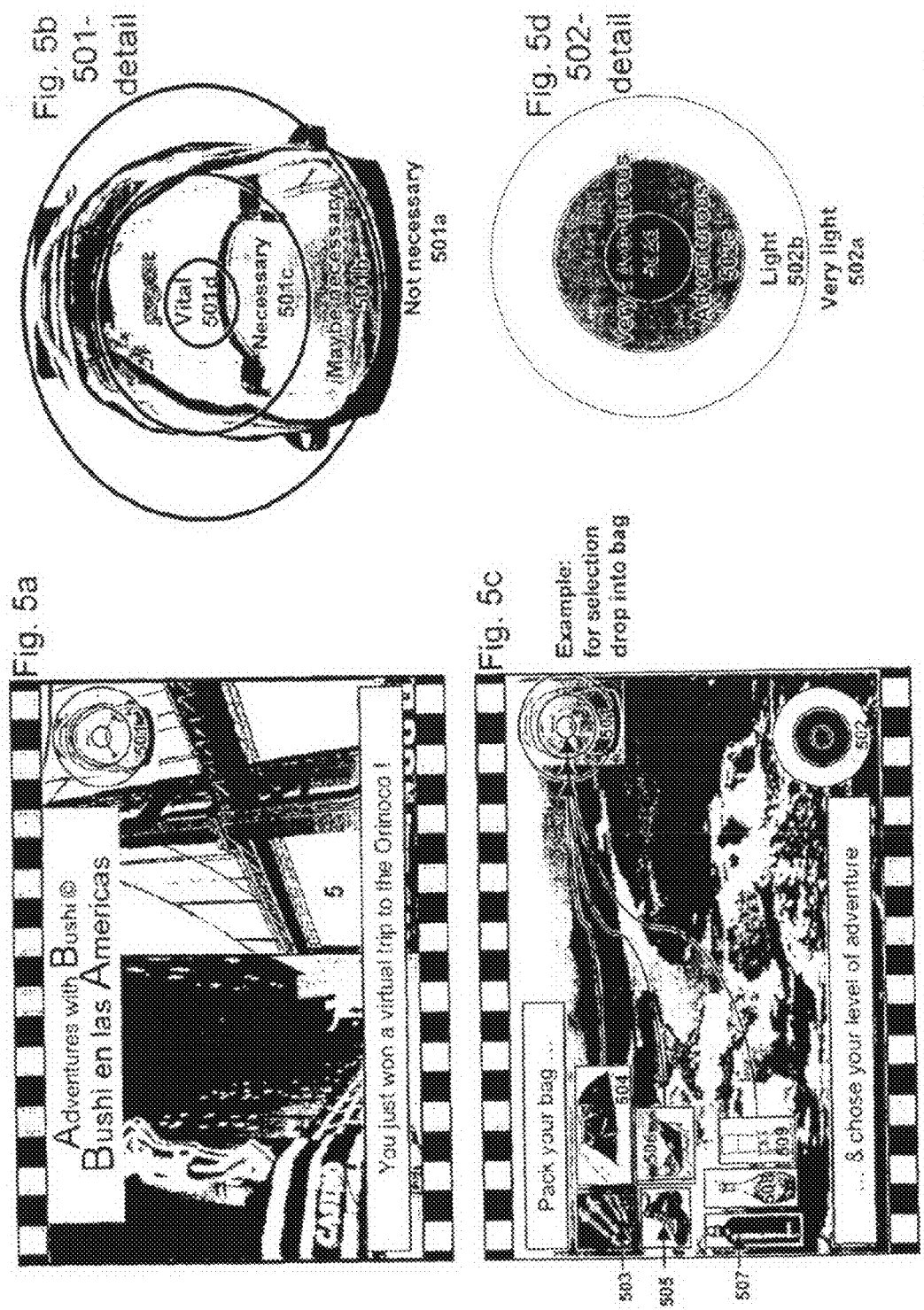
Fig. 5. Multilevel semiotic user interface for gaming, selecting, betting, voting, searching & similar applications

MULTILEVEL SEMIOTIC AND FUZZY LOGIC USER AND METADATA INTERFACE MEANS FOR INTERACTIVE MULTIMEDIA SYSTEM HAVING COGNITIVE ADAPTIVE CAPABILITY

This is a National Phase Application in the United States of International Patent Application No. PCT/EP2006/008112 filed Aug. 17, 2006, which claims priority on European Patent Application No. 05018222.9, filed Aug. 23, 2005. The entire disclosures of the above patent applications are hereby incorporated by reference.

FIELD OF THE INVENTION

Introduction

The invention pertains to providing variably programmable interactive user and metadata interface means for interactive content production, broadcasting and using via interactive media devices, systems and applications. It also pertains to content configuration, structuring and support to facilitate authoring, production, distribution and use of such interactive systems.

BACKGROUND OF THE INVENTION

The programmable aspect pertains to using multilevel semiotic addressing and differentiation means, fuzzy logic interpretation means and fuzzy semiotic expert system means. The means are made to provide individual and variable user experiences as well as qualitative evaluations and qualifications of the content and its user. They allow to construct a user and provider friendly interactive multimedia-system and a related usage expert system. For the purpose of the invention, a game, a film, a docu-fiction, a documentary, a tutorial, an advertisement, a music clip or full show recording, an info- or ludo-tainment program and the like as well as combinations thereof correspond to the definition of content. Within this context they are summarily considered to be stories rendered via audio and AV production and broadcasting.

Variably programmable interactivity according to the invention hence applies to all still or moving picture based applications, audio or AV applications, such as movies, feature films, films, animations, games, documentaries, docu-fiction, clips (short versions) in general, clips of shows, sporting events, news, alerts, performances, advertisements, or tutorials, infotainment, edutainment, ludo-tainment.

It also applies to printed material with novel features and interactive means and characters, dolls, toys, robots and the like that benefit from providing the viewer or user with individually variable interactivity means and correspondingly configured content.

It applies to all story telling which is based on still or moving picture and sound receiving and sending devices and systems. Such devices may be contained in but are not limited to the following list. It applies to digital and analog video and AV applications including video on demand (VoD) and media centers including 3D and virtual reality based AV systems. It also applies to a variety of fixed, portable and on-board devices and combinations thereof for viewing and interactive usage such as TVs, set-top boxes (STB), recording/playing devices like digital and personal video-recorders (DVR and PVR), arcade game stations and 3D and virtual reality rendering systems. It also applies to AV projectors, PC's, media-centers, POI and POS displays, PDA's, portable memory devices, download/store/replay devices, phones, alert, alarm, messaging and planning devices, biometrics, personal diagnostic, medicinal dosage and delivery devices, tablet computers, e-books, i-books, audio-books, flexible displays and the like.

It applies further to fixed, portable and on-board CE (Consumer Electronic) devices and combinations thereof and other known devices including interactive dolls, toys, robots, appliances and the like.

Interactive systems are mostly used to transmit a message, a story, a sequence of stories or stories inserted into other stories. The stories are told, programmed and rendered via scripts, story-boards, programs, real-time input or sometimes a simple sequence of events which relate to an episode of particular story or chapter of a tutorial.

Sometimes one or more characters or one or more narrators take the viewer through living the story. This happens via programmed acting, interventions, events, situations, actions, reactions, encounters, verbal, visual, sound, lighting, speed, various special effects like noise or scent and the like used to convey the message of the content. These means are also used to enhance the experience of the viewer.

In the present invention a story can be a description of an event, a product, a service, a geographical, physical, fictional or real entity, a process or event. It can be represented by a sequence or mixture of event, clip, advertisement, finished story, episode of a story and the like.

A complete story is considered either a single story or the sum of stories packaged together in an offering to the viewer. It is called a content, an asset or a resource depending on the point of view, for example product ownership or producing standard.

The terms "story", "content", "essence", "asset", "digital item" and "resource" will be used interchangeably through the present application.

It will mostly be summarized as "content", depending on the terminology used in cited documents and items or in the description of the invention.

A distinction will however be made between "main content" and "sponsored content", "main content" signifying the movie, show and the like "main" content selected by the viewer for enjoyment and "sponsored content" signifying the advertising, news, clips, information and the like content inserted and telescoped into or tagged onto the main content.

The combination of main and sponsored content and the respective metadata etc will be called a "digital item" if considered so according to MPEG 21.

It will be considered "total content" outside of MPEG 21 or within any other similar, existing or emerging standard.

In each case the interactive system contains variably programmable interactivity points located freely within the selected moment, place, situation or event in the script, the scenario or the story-board and is introduced and operated by simple semiotic means within the display of the packaged complete story.

The terms "variably programmable interactivity point" and "interactivity potential" will be used interchangeably through the text of the present application.

The variability of the interactivity is expressed on one side through programmable means of the attitudinal expression(s) or decision(s) with which the character(s), the narrator(s) or the user(s) or both, or the three navigate(s) through the story. The variability is also expressed through reactions of the characters(s) or narrator(s), or user(s) interactions between the character(s), the narrator(s) and the user(s). The attitudes, decisions, reactions and interactions further lead to variably programmable paths which a story can take in and to variable effect(s) in the user's living experience of the story.

Multilevel semiotic means are used as a simple yet expressive user interface and allow a content related, intuitive representation of the interactive elements and the process involved. The means also allow a quick and easy use of such variable programmable interactive multimedia systems.

Fuzzy logic membership functions and rules are used to provide descriptor and interpretation means for qualitative attitudinal and decisional approaches.

The means are used for intuitive navigating, viewing, playing, and living the multimedia content and for rating and evaluating according to the application.

By functional and meaning related links between fuzzy logic interpretation means and multilevel semiotic representation means according to the present invention, it becomes possible to execute the innovative interactive functionality in an unprecedented way.

According to the invention, the expressions of interactivity parameters and operations are coded and interpreted in fuzzy logic sets and rules, implied by and interfaced via the multilevel semiotic system.

This allows the unprecedented use of multilevel "fuzzy" (qualitative, linguistic, descriptor) semiotic definitions and variables, "crisp" (numerical or true-not-true) variables, visual and other and semiotic representations, fuzzy logic decision criteria and weighing factors.

The inventive multilevel semiotic and fuzzy logic user interface is used to provide elements of surprise in living the story and interpreting actions, reactions, decisions, votes and scores.

It also provides a simple, intuitive and powerful interface for the user as well as authoring, adapting and authorizing tools for the content author, provider and broadcaster.

The multilevel semiotic and fuzzy logic interactivity system according to the present invention also provides the basis for expert system learning capabilities within an interactive application with regards to the preferences, tendencies, and habits etc of the viewer.

In combination with the multilevel semiotic means according to the invention, the expert system provides potential on-line or separate input, evaluation and information benefits to the media broadcasters, producers and sponsors.

Interfacing the multilevel semiotic and fuzzy logic interactivity system with the content metadata according to the present invention represents a further inventive step, allowing flexible authoring and protecting the interactive content.

Networking will allow users to live comparatively different experiences of a story, an episode or a multitude of episodes and stories, experiences which can be shared and evaluated within multi-user or multiplayer groups and by the supplier(s) of the interactive application or service.

The expert system based on the fuzzy logic and multilevel semiotic system according to the present invention will then provide the basis for evaluation of individual and group dynamics, behavior and learning as well as group sharing and the related potential and evolving on-line benefits to the media user, broadcaster, producer and sponsor.

Additional Comments Regarding Field of the Invention

In general and in the simplest sense the invention relates to interactive story creating, transmitting, receiving and playing using interactive systems and applications.

More particularly, the invention relates to interactive user and content metadata interface means and to means to facilitate content configuration, authoring, production, distribution, authorizing and use of interactive stories.

The invention relates particularly to stories which are configurable and programmable to provide individual, variable and evolving user approach and experience.

Variably programmable interactivity according to the invention applies to all still or moving pictures based story AV transmitting and receiving, to audio story transmitting and receiving on audio devices having an interactive user interface and capabilities and in general to AV devices, systems and means which are equipped to be used interactively.

This signifies, without limiting the invention to such means and systems, that they are equipped with features to convey interactive functionality like displays, keyboards, control devices, built-in or attached memory, software and communication capability beyond simple picture plus sound or picture or sound only playing means for viewing, recording and reproducing.

Further Comments Regarding Background of the Invention

Interactive video and AV systems on one support are well known at least since the advent of formats and devices like the CD-i (Compact Disc interactive) in the late 1980's. (The CD-I Design Handbook, Philips IMS, © 1992 Philips Electronics UK Ltd). Since then the evolution of FMV (Full Motion Video) to MPEG (Motion Picture Experts Group) and MHEG (Multimedia and Hypermedia Experts Group) based ISO standards has seen important progress. The development of techniques like UMID (Unique Material Identifier), of HAVi, of interoperability IT networks for home based AV, of the Internet, of digital audio and video broadcasting like DVB-T and DVB-H, of short-range wireless communication systems like Bluetooth™, Wi-Fi, of WiMax, of XML, WML, MFX, QuickTime™ and the like have been remarkable. Hardware and software performance of communication networks, of high performance multi-platform languages, of virtual machines, of interactive authoring program modules such as Java™, of Java™ applets as well as highly configurable operating systems have allowed to fulfill and to surpass by far the pioneering time dreams of living the interactive experience by viewing, playing enjoying and learning. The amount of content delivered and the ways to deliver them to the user is ever increasing, same as the amount of content generated by non-traditional sources. The merging of technologies, devices and formats allows to expand the notion of interactivity beyond a single type of content or device. It also calls for innovative tools for convergence which provide usefulness beyond viewing or playing.

Prior systems and methods of providing interactive video and converting content for interactive use by describing and tracking objects are disclosed in U.S. Pat. No. 5,684,715, Palmer; U.S. Pat. No. 5,844,557 Shively II; U.S. Pat. No. 6,154,771, Rangan et al.; U.S. Pat. No. 6,462,763, Mostyn et al; U.S. Pat. No. 6,496,981 Wistendahl et al.; U.S. Pat. No. 6,570,587, Efrat et al; US 2003/0085887, Hunt et al; U.S. Pat. No. 6,693,649 Lipscomb et al, U.S. Pat. No. 6,774,908, Bates et al and U.S. Pat. No. 6,625,315, Laumeyer et al. They necessitate detection or identification, mapping and tracking of spatial and temporal position of "hotspots", pixel objects etc relating mostly to a fixed or moving object on the screen within a video sequence.

It can be extremely tedious to author such interactive applications because of the volume of the object mapping data per image display frame, the respective linkage through a number of such frames, the varying position of the object within a frame, sometimes the varying size or the color of the object, the need for shape-fitting algorithms, non-linear transformation, interpolation, color filters and hence of the complexity of algorithms, of crisp and fuzzy logic scrutinizing and selection and the volume of mapping data for a frame sequence. These systems require excessive processing power and sometimes feature tedious user interfaces by requesting the user to pursue the moving hotspot within a moving picture or to wait for it to appear at a particular moment on the screen in order to obtain access to the interactive feature. Additionally the interactive feature itself is more or less limited to respond to moving objects. However the user may also want to know about the availability of interactive features related to audio or video background, to parts of the background, to scenes, to scene content or context, be it related to a part or parts of the audio content or simply to surprising author or producer input or to spontaneous user input.

The provider on his part may want to furnish and use these features as can be envisioned by today's emerging technology and consumer demands. It is therefore a first objective of the invention to provide novel multilevel interactive means to create, to position and to address interactivity opportunities.

The novel multilevel interactive means disclosed by the invention locate interactivity opportunities which can be related to a moving object without tracking the object itself on the display, or to tracking a scene, its background, or a part or parts of the audio or video content, to a particular context of the related story, to an insert like an advertisement or a spontaneous viewer or producer input.

All of the prior art documents mentioned above only disclose interactivity points related to locating a hotspot and leading to a defined target or targets. It is therefore a further objective of the present invention to provide signs for the interactivity opportunities in a manner that is independent of the shape and relative position of related objects, of backgrounds and scenes as well as of the duration of appearance of a related part or parts of the video and audio content.

Other prior art relies on cooperating devices or add-ons to provide interactive content synchronized with existing content which was not originally intended for interactive use. US 2002/0100063, Herigstad et al, teaches the delivery of interactive material via a second, mobile device to a user viewing video content on a first, fixed device. For reasons of practicality the user needs to be in close proximity of both devices. Tags broadcasted to the mobile device and related to the content and timing broadcasted to the fixed device permit the user to receive and store information and other items of interest on the mobile device for retrieval when desired. The information and other items of interest can be tailored according to known preferences of the mobile device user.

US 2002/0161909, White, teaches the use of downloading a hotspot applet synchronizing a hotspot file with any streaming video file and relies on a web browser within the Internet receiving device for reading and storing the hotspot data file and where the temporal component is synchronized with the video stream.

WO 01/10118 relates to web-based TV and teaches the use of receiving a TV signal including a graphic symbol which generates an active region within the TV display that is related to the graphic symbol and which triggers an action in response to the viewer, sort of a cookie-like hotspot which can lead to user information overload and encumbered access to the really desired interactivity content.

EP 1 304 876 A2 discloses a system and method to display additional information, such as advertising, associated with a selectable display area displayed as additional content together with a given main content. The selectable display area may be visually identified within the main content display by indicators, such as borders around the selectable display areas or icons. Possible actions to be performed by the viewer include retrieval and/or display of specific content including text, video and audio content. A system and method to embed the selectable additional content within the main content stream is also disclosed.

WO 00/70489 teaches about providing hotspots and hotspaces in a shared virtual world, defined primarily as 3D virtual world. Hot spaces are disclosed as being 2D or 3D dimensional areas of the virtual world. Most of the interactivity opportunities thought in this document are related to space, transport within space and occupation of space. Interactivity can be triggered when a user comes close to a predetermined virtual distance to the hot space or clicks on the hotspot or hot space.

None of these prior art systems allow the user to express his/her preferences for a differentiated action related to the interactive opportunity but are limited to addressing the given hotspot or hot-space without further choice. Hence a hotspot or a hot-space always seems to lead to one single, predefined target, for example a source of information, like advertising, news, music clip, statistics or the like or to a place like a website. It also seems to lead always to a defined action like exploration, occupation or destruction of a space or object, sometimes via one or more clicks or commands and sometimes needing more than one device to achieve a relatively limited interactivity potential.

"Clickability" is an important aspect of evaluating a user interface. It is therefore a further objective of the present invention to provide novel multilevel means to create, to position and to locate interactivity opportunities related to a moving object, to a scene, to its background, to a part or parts of the audio or video content.

The interactivity opportunities can relate to a particular context of the related story or to an insert not necessarily related to the story. The multilevel means will be disclosed further on as extremely simple. They limit the amount of "clicks" or "pointings" needed to execute interactivity commands. They can run on fixed or portable device and software platforms or on interactive CE devices including interactive dolls, toys, robots and the like with minimal changes and overhead on a multi-platform language.

It is also a further objective of the invention to provide a method of signifying the interactivity opportunities which varies little in the sense of software effort between 2D and 3D applications as well as between "light" applications like clips and "heavy" applications like a docu-fiction or a complex 3D game.

It is another objective of the invention to include variable factoring of user attitude, choices and capabilities into the application, not only in the choice of targets, but also in terms of the outcome of the story. Most, maybe all video and AV applications rely on a main character, often in close relationship with other characters to convey the story to the user or on one or more narrator(s) often representing one or more invisible character(s) belonging to the story. The obvious lack of creating meaningful interactive connections between the user and the one or more characters or the narrator(s) requires further innovation to provide novel, interesting and captivating interactivity opportunities.

Ideas for providing interactive media opportunities have been generated since quite a while. In printed media for example, as shown by U.S. Pat. No. 886,172, Bevans, 1908, an educational device is disclosed, comprising a plurality of sections, pivoted together only by a common pivot. Each section thereon has a letter of the alphabet and a pictorial representation designed to be indicated by the letter. For example the 0 section corresponded to Owl, the W section to Winkie and the C section to Cock Robin and the 3 sections together to form the word COW, shown, including the image of a cow. This result appears if the sections were correctly positioned.

The interaction centers around the pivot and the images and words on both sides of the pivot. The idea was simple, effective and ingenious at the time, leading the user through sort of a pivotal "what you see is what you get" approach, something that we all learned much later to appreciate or not in early personal computing systems.

The subject of interactive systems has further been explored in the eighties on the print level for example by John Brennan© Text, 1984, (Geoff Taylor© illustrations) in the book "The crypts of Terror". With the help of dice, pencil and eraser the story in the book can be read and experienced in twists and turns as if the user was the hero of the story. More recently, interactive story books have been disclosed, such as in U.S. Pat. No. 5,447,439, Nathanson, where a first element of information located on a first place is complemented by a relating second and third element, coming from 2 parts of a second place. The user, mostly a child, was involved to a higher degree than in the previous documents, but still without having its own input. This document became sort of a precursor of early computer aided tutoring systems, such as disclosed in Document U.S. Pat. No. 5,618,180, also Nathanson, teaching the use of a computer to achieve very much the same objective as in the previous document.

Around the same time other documents started to appear, teaching interactivity resulting from an interface between physical objects like dolls and computers like PCs. WO 97/32200, Kikinis, describes an interactive system for training, entertaining and habituating a child via: a doll having a microphone, a speaker, a bi-directional communication link to a PC, data stored in the PC directing doll activity and verbal articulation, response from the user through the doll to the PC via audio conversion circuitry commanding verbal and physical articulations of the doll.

U.S. Pat. No. 5,636,995, Sharpe et al, discloses the synergy between an interactive story book and a graphic tablet via sound clips by association of touch sensitive areas combined with overlaid paper based images.

U.S. Pat. No. 6,010,405, Morawiec, teaches a videogame system where the episodic nature of a particular, simulated comic book script is mostly represented by the corresponding videogame source including game data and instructions. A player-controlled input device to control movements of the player-controlled character is also disclosed.

WO 01/14032, Philyaw et al discloses a sensor based interactive doll located on a node of a global communication network, reacting to stimuli by a user or resulting from user conditioned signals to the one or more sensors.

The user is connected with one or more remote nodes on the communication network in connection with HTTP (Hypertext Transfer Protocol, HTML (Hypertext Markup Language), TCP (Transport Control Protocol) and IP (Internet Protocol) and accessing networks by the locator URL (Uniform Resource Locator) and where the one or more remote nodes return response to the sensors having been activated.

WO 99/00979, Del Castillo, discloses a method and system for encoding control data line by line in video frames into the horizontal over-scan of video signals. Thus, the control data are being synchronized with the underlying video signal and allow controlled devices, such as wireless, mechanical characters to behave like characters in a play or a scene, provide subtitling, e-mail and other functions.

WO 02/47013, Beck, discloses an interactive toy, doll or game play apparatus, being a powered host containing a game unit, RF antennas and playing objects with RFID tags to interactive communication between the doll and the objects, directing the user to position the objects correctly relative to the host and giving feedback on that action.

U.S. Pat. No. 6,554,679, Shakelford et al, teaches the interactive virtual character of a doll that simulates the character of a live person, animal or fantasy figure, mostly by displaying needs, affection, a certain degree of intelligence and/or understanding. This is coupled with a real time clock allowing the interactive virtual character doll to "run" within a user's (child's) living schedule and with a number of external objects that the user (child) is supposed to administer to or otherwise use to play with the doll and which the doll is able to identify.

U.S. Pat. No. 6,663,393, Ghaly, discloses methods that go much further in putting interactive capability into a play device such as a doll. The play device provides functionality that can base itself on past experience with a user and requires response from a user, response which again will be memorized in order to shape the next interaction.

Despite the rising complexity crammed into a particular toy, the cited documents fail to establish a level of connivance between the central character or the characters or the narrator(s) of a story and the user. There is no mention of including and respecting the user, presumably an infant, within the significant complexity of the device and the game. Additionally playing with these high tech toys turns out to be cumbersome for infants and the reliability of operation decreases with the increasing complexity, notwithstanding children's preference for cuddly toys. Some of these interactive dolls, robots, etc., could be thought of like laboratory versions for the interactive home control systems of the near future. However infants and adults alike react easily to the power of still or moving images and the thrill of participating in the evolving story.

It is therefore a further objective of the present invention to put meaningful interactivity into images or image sequences by providing novel multilevel, yet simple, visual means to create, position, locate and interface with interactivity opportunities related to a moving object, a scene, its background, a part or parts of the audio content.

It is also a further objective that the same means treat the response or action of a central or supporting character, be it in a physical or virtual embodiment or particular context of the related story. The response or action can correspond to a basic, initial attitude, choices made and further variations thereof with which the user, the central character, other characters including a narrator, as may be the case, approaches or goes through the story.

It is also a further objective of the invention to provide the user with means to modulate the initial attitude and variations thereof to a certain degree within a story. The modulation may reflect his or her own appreciation and attitude towards the content, the context and development of the story and may lead accordingly to a set of different outcomes. The modulation may relate to a component or degree of the attitude which he/she has programmed for him/herself, the central character or other characters including a narrator or a particular context as may be the case to approach or go through the story.

It is a further objective of the invention to allow the user to modify the initial attitude and variations thereof into at least one more further means to modulate the further attitude and variations thereof to a certain degree within a story.

It is a further objective of the invention to obtain a number of evolving or simply different outcomes according to a number of the varying degrees of the further attitude, which he/she has programmed for the central character, other characters including a narrator, as may be the case to approach or go through the story.

It is a further objective of the invention to allow the story provider to furnish different outcomes of interactive stories according to qualitative appreciation of the user's expressions of attitudes, reactions and variations thereof.

It is a further objective of the invention to furnish innovative interactivity training means to complex applications such as 3D games or other I-AV applications by using a simple interactive means compatible with video or AV presentation of a story and of a simplified sequence thereof.

It is a further objective that the training means according to the invention may illustrate the interactivity opportunities related to an object, a character, to a scene, its background, to a part or parts of the audio content or a particular context of the related story. The training means will relate the interactivity results according to a particular attitude and variations thereof with which the central character, other characters including a narrator as may be the case to approach or go through the story. As can be easily imagined these training means can be applied to full-fledged "heavy applications" such as 3D games or other complex AV applications.

It is a further objective of the invention to provide additionally to the graphic embodiment, a virtual AV embodiment or a physical embodiment of the central character, other characters, the narrator or a combination thereof as the case may be, the physical embodiment carrying AV means for communication and interactivity.

It is also a further objective of the invention in anyone of these physical embodiments to carry means to transfer a tutorial, a summary or an introduction to a suitable fixed or mobile interactive support. By this transfer the physical embodiment will show via the novel means how to create, to position, locate and interface with interactivity opportunities. The opportunities can be related to the interactive system and its components, a moving object, to a scene, to its background, to a part or parts of the audio content, to a particular context of the related story.

It is a further objective of the invention to relate to the user a response or action of the interactive system and its components, like a central or supporting character, be it in a physical or virtual embodiment. The responses or actions can further correspond to a basic, first attitude, choices and variations thereof with which the central character, other characters or the narrator as may be the case, approach or go through the story and how variations of the first attitude can affect the outcome of the story. Along the lines of progress in technology, content manipulation and content itself has been progressing in order to provide the user with more and more interactivity means.

More recently, as listed below, electronic game content has been created to provide interactive, episodic content delivery to a user, to allow behavioral learning, to provide virtual world environments having communication clusters and to respond to interrupt conditions such as occur in fast paced interactive systems like car races, war games and other I-AV content where pace, space domination and surprise effects are key content elements.

U.S. Pat. No. 6,669,564, Young et al discloses a system, method and apparatus to deliver episodic delivery of entertainment content to users. Indeed, one of the challenges of episodic delivery relates to incorporating technology updates into new entertainment episode delivery over remote servers to a user.

WO 0146910, Hatlelid et al disclose a method to create behavioral modification and behavioral learning based on utterances relating to gesture commands and leading to behavioral rules fitted with arbitrary weights to accommodate similarities in utterances and meaning.

WO0133327A1 Hatletid et al discloses a system of chat clusters in a virtual world using avatars and their behavior to indicate to the user which participants in the chat clusters are conversing with each other and which ones are available for approach.

U.S. Pat. No. 6,733,383 B2, Buses et al teaches simulating state changes of computer games based on interrupt conditions generated by a computer including the possibility for the user to select responses to the interrupt conditions.

US 2003/0180700 A1, Barry et al discloses a user controlled educational program allowing the user to select the learning method and the relevant material and to share information within and outside of the learning system.

WO03041393A2, Arnold et al discloses a real time interactive video system. It relies on the user watching real time content on TV, having a separate viewer interaction platform ready, such as a personal computer, a set-top box or wireless means such as a PDA or a mobile phone to access pre-stored content frames on an internet server and from there decide which frame or pixel object on a frame to select and thus access a new content source or resource platform. This fact indicates that for most users it may not end up to be easy to use real time interactive system, given the difficulty of providing real time interactivity in an analog world.

U.S. Pat. No. 6,253,238, Lauder et al describes an interactive CTV (Cable TV) system with a frame grabber which is controlled by a remote processor communicating with home interface controllers over the cable network and which for a viewer selected input frame generates an output frame which can be converted into a TV information signal. However the world is becoming more digital every day and this digital evolution helps to overcome some of the cited problems.

For example US 2002/0124004 A1, Reed at al describes a multimedia search system which takes advantage of at the time recent technology to present state of the art text, picture, audio and animated data retrieval with limited interactivity and fun in the interaction. On the other hand, a growing number of ways, of complexity and of means of access to multimedia content via an increasing number of devices and delivery channels may lead to increasingly complex systems and methods for media management. For example WO 2004/088664, Bettridge et al discloses a method for middleware controlling metadata associated with various media items in a media editing system in which a plurality of media items are related in a "parent-child" relationship in one-way or two-way propagation way from one media to another.

US 2004/0148636, Weinstein et al discloses a method and system for browsing interactive broadcast and web information content, which are presented together, where the presented web information is fully interactive and where the user can rely on all known features of state of the art interactive web presentation. It is easy to see for the person skilled in the art that many media assets in today's interactive, non-linear multimedia story telling content do not always easily permit to establish firm parent-child and other associative relationships. It appears to the inventors that metadata could tend to become nearly as diverse and complex if not more so than the media themselves.

Hence the inventors saw the need to provide interactive user and metadata interface means which deal efficiently with the diverse and growing interactive multimedia environment, yet are simple and effective. Much effort has also gone in developing the fields of streaming and workflow methods for authoring, transmitting, linking and managing multimedia assets (MAM) and multimedia metadata. As mentioned above, the latter field is closely related to the objectives of the present invention.

WO 0045294A1, Chan et al discloses a media metadata storage structure consisting of a number of storage entities related to the media materials.

WO 04057438A2, Chang et al discloses a metadata authoring system for multimedia applications, specifically for content browsing and editing purposes.

U.S. Pat. No. 6,523,046B2, Liu et al discloses an infrastructure for providing access to multimedia file metadata provided in any set of known and supported formats like TIFF, GIF, BMP, IMG and the like which are rendered in a generic format by suitable metadata decoders.

WO 04049199 A2, Incertis teaches linking target files to a main file by encoding the target addresses (URLs) of these target files into the primary filename of the main file.

EP 0941607B1, Chapman et al discloses a system and method for set top boxes to display content in response to viewer input and related to categories of information.

WO 02058383A1 Hensgen et al discloses receiving a broadcast of a program containing a plurality of perspectives of the program, presenting at least one of the plurality of perspectives to the viewer and displaying recorded perspectives to the viewer without interrupting the broadcast.

WO 0169369A1, Delpuch, discloses a system and method of choosing an item from a list of items appearing on a screen by scrolling through the list and where the scrolling process is slowed down for the user in function of a certain condition or quality of the item selected via the scrolling process.

U.S. Pat. No. 6,400,996, Hoffberg et al discloses an adaptive interface for programmable content delivery based on user preference history which are transformed into preferred program indicators which themselves are included in a program category having weighted preference values as well as on machine status and context data.

U.S. Pat. No. 6,418,424 Hoffberg et al discloses an adaptive user interface for predicting a desired user function based on his/her user history and on machine internal status and context.

WO 05008993A1 Fablet, describes a document related to a server network and features necessary for validating multimedia documents in function of the MPEG 7 description of the documents.

In the context of metadata management it might be useful to cite the "Dublin Core Metadata Initiative", an authorative specification of metadata terms, (http://dublincore.org). One has to consider however that such standards and specifications are continuously evolving and hence, same as other standards related to the field of the invention cannot be considered limiting for the purpose of the invention.

For example so-called "Middle ware" exists to provide end-to-end solutions, spanning from the source-end (head-end) of content reception and storage for TV channels to VoD, Web portals etc and to the consumer. In this context, advertising "clips" which in order to be attractive, tend to turn into "content" hence will be referred to as "sponsoring content" for the purpose of the invention. In contrast, the main content meaning the "essence", the asset, the movie, the game, the edutainment, the docu-fiction, the live show or event and the like as described above will be called "main content" for the purpose of the invention.

As mentioned before, addressing the integration of "sponsoring", "main" and "total" content, data called "metadata" (Data about data) are increasingly used to identify and to link the various components of total content together in order to furnish a seamless stream of multimedia to the viewer or user. Hence the invention relates to metadata as a link to and an active part of the innovative multilevel user interface, but is not limited to metadata. Metadata are usually, but not exclusively, located within the "logic layer", meaning between the user connected "presentation layer" and the "content or asset" layer, called "data layer". In some cases metadata are located within the content layer itself for content description and are suitably connected within and between these layers.

Content encoding technologies like MPEG-2, Windows Media™, MPEG-4, metadata management tools or "container formats" like MPEG-7, QuickTime™, FlashPix™ and XML based content descriptions and other file formats like AAF, MFX, related description schemes and the like. These technologies and tools strive to organize content and metadata and can be realized in very simple as well as in very complex interactive structures. The file formats are conceived to be preferably agnostic to the metadata schemes in order to allow utmost flexibility to content editors and broadcasters in the definition and control of metadata. Content organization and retrieval is mostly structured according to spatial, temporal and visual data-types as well as according to content relationships. Metadata are generally separated or categorized into content description, a term which seems self-explanatory. They are further separated into segmentation description which relates to timing and sequencing relationships between diverse contents, into instantiation description relating to a program schedule for the selection of a particular content (sponsoring, main or spontaneous) and into consumer metadata which relate to the consumer's history and preference of content usage. The tendencies to create composite digital items, incorporating metadata into the main or sponsoring content itself or vice versa, into the multimedia servers, into the digital capture and reproducing devices and the like will lead to blurring of definitions for some time and maybe will exist in, albeit a few, economically viable crossover variants for times to come, but metadata are set to remain the content interface path with user interface items in the years to come.

US 20050033760A1, Fuller et al, discloses a digital capture system, capture relating to capturing images via a digital camera or a digital recording device, which allows to extract, format and store metadata and combine them with digital content data in suitable formats such as MPEG-7, QuickTime™, FlashPix™ and the like.

U.S. Pat. No. 6,850,252, Hoffberg, discloses an intelligent electronic appliance embodied preferably by a set top box for interfacing the user, the appliance and broadband media streams and having a metadata processing system compliant among others with MPEG-7 data and incorporating digital rights management features.

U.S. Pat. No. 6,748,382, Mohan et al describes a system and method for describing and managing media assets via storage techniques, a central repository, meaning a digital library and a standard description scheme and tools allowing for media asset management using XML.

US 20030179824A1, Kan et al discloses a method of using the MPEG-7 descriptor technique via object segmentation in order to extract, store and segment video object planes into a plurality of regions by color transformation and the watershed segmentation process.

US 20030187950A1, Rising, discloses a system for selecting digital material objects containing MPEG-7 content descriptions via a query generation tool and a search engine looking for MPEG-7 META tag information.

U.S. Pat. No. 6,411,724, Vaithilingam et al discloses a multimedia information retrieval system which uses meta-descriptors in addition to descriptors of the multimedia information, or "feature" descriptors.

US 20010054150A1, Levy, discloses watermark embedding in a media object in order to specify how the media is to be rendered by combining identification information, location information and information specifying the use of the watermark for various media types and formats, parts of the media object and the desired rendering quality.

JP 2001-086434A2, Park et al discloses the use of a degree of motion description method via MPEG-7 decoder retrieval and decoding.

JP 2003-256432A2, Hiki Haruo, teaches retrieval of image and voice materials in an archive database using an MPEG-7 file via a genre dictionary, a remote retrieval/edit terminal and further edit devices.

JP 2004-153782A2, Huang Zhongyang et al discloses a method to provide digital item adaptation (DIA) for example for advertisement metadata using XML and according to MPEG-21 and defining negotiation mechanisms for transmitting, exchanging, updating the DIA and mostly adapting the digital item so that its content can be transmitted between different kinds of devices according to their respectively different capabilities.

WO03075575A1 Huang Zhongyang et al discloses a stepwise de-multiplexing, retrieving and extracting method interpreting meanings out of the DID (Digital Item Declaration) according to MPEG-21 and interpret the actual meanings of each DID element and transferring the element to the IPMP (intellectual property and management parser) for activating the IPMP protection and management tools.

WO03071807A1, Vetro, discloses a method and system to consistently adapt a digital item according to MPEG-21 via coherent modification of the item's resource and the corresponding resource descriptor. MPEG-21, as an emerging standard, is defining a multimedia framework to enable transparent use across an up-to-date range of networks and devices by implementing the notion of a "fundamental unit of transaction", called a "digital item". The digital item is defined as a structured digital object having a standard representation and identification as well as associated metadata or other descriptors of resources contained in the digital item such as multimedia main or sponsoring content.

Given the complexity and data processing "overhead" of some of these systems and the yet sometimes rudimentary means of interactivity presented to the user, it becomes clear that the interactive system domain needs innovation. It lacks simple, pervasive and innovative ways to communicate between the system, its virtual actors and the user, be it a gamer, a student or a TV viewer. Given the plethora of choice, the user wants TV, gaming, news, clips, ads, sports etc "his way", but none of the cited prior art seems to take into account the user and his/her growing confusion about the enormity of choice as well as the complexity of migrating between applications.

The user might however also want, "maybe, definitely, sometimes, always, most of the time or never", to know about, explore and enjoy opportunities for interactive usage without disturbing too much the main content just being viewed. Also none of the cited prior art seems to take into account the content providers, e.g., the authors, producers, broadcasters and the sponsors who, far beyond well known POS (point of sales) tactics, would like to know more about the user than his name and address. They need to acquire this knowledge in order to tailor the content offering or just to know about the user's reaction to an ad, to a main content or about a reason for a particular vote on a candidate, a show or any item that requires such information and evolution according to user demand. This on-line information gathering should not distract the viewer from enjoying content primarily destined for entertainment, education or information exchange and at the same time it needs to comply with privacy laws in a variety of countries. This ensemble of seemingly disparate but nevertheless coherent and durable challenges is what struck the applicants as a field needing a simple, inventive, innovative, pervasive and practical means and a universal metadata subsystem for interactive digital content access and usage.

The innovative means are created to satisfy both the user's and the content provider's needs, to be compatible with present standards, techniques and technologies and to able to evolve easily into the future. It is therefore an objective of the invention to provide the content providers and the user with simple means to structure highly interactive main and sponsored content and to let different users approach the same story in different ways.

It is also an objective of the invention to let the content provider furnish different outcomes that relate to these different user approaches and hence create evolving interactive content or characters.

It is also an objective of the invention to provide simple tools to insert interactive means into a story during the initial authoring of the story or during programmed insertion of media like adverts or during live insertion of content like sports or news, basically in any stage of configuring content.

It is further an objective of the invention to provide links between the stories to let the user migrate freely between them.

It is further an objective of the invention to let the user modify his approach and rate his/her feeling of the corresponding experience and communicate and compare with other users.

To this end multilevel semiotic means with fuzzy logic descriptor sets coupled to the multimedia metadata form the basis of the inventive interactive multimedia system and are coupled to an evidential reasoning based on cognitive semiotic multimedia expert system. The means are used to reach these objectives in unprecedented manner, effectiveness and simplicity. The notion of "fuzzy" logic appeared first in 1965 when its inventor, Professor Lotfi Zadeh published a paper called Fuzzy Sets. (Zadeh L. A., (1965) Fuzzy Sets, Information and Control 8, pp 45 to 67. Ref: Prof. Zadeh, Director Graduate School, Berkeley Initiative in Soft Computing, BISC; University of California). Since then, fuzzy logic and fuzzy expert systems have made their way into an enormous amount of successful products and means to control devices, cars and industrial processes, to profile investors, clients, risks, to provide data compression algorithms for video and audio data (including MPEG applications) and Artificial Intelligence (AI) gaming. The products and means are used to extract essence out of data, to process images and sounds, to build expert and decision making systems, such as EP 0 748 482 by the same inventor. Fuzzy logic systems and fuzzy expert systems can easily be programmed in C++ or in Java™ source code, their representation and user interface through applets is very common, the organization usually includes HTML files, class files, domain files, rule files etc.

Lotfi Zadeh stated the principle of incompatibility: As the complexity of a system increases, our ability to make precise and significant statements about its behavior diminishes until a threshold is reached beyond which precision and significance become almost mutually exclusive characteristics. This statement certainly applies to the complexity of the interactive multimedia system including its interface with the user and explains why the inventors chose the route of applying fuzzy logic to the means for interactivity according to the invention. Computing with words instead of or additionally to numbers and processing perceptions instead of or additionally to measurements is well suited to describe and to evaluate the qualitative and sometimes even emotional relationship between the user and the content viewing interface, between the user and the content and between the user and the content providers and sponsors.

The inventors further innovate the notion of computing with words by introducing the notion of computing with "fuzzy multilevel semiotic expressions". The expressions according to the invention consist of multilevel semiotic means, directly corresponding and related fuzzy logic semiotic descriptors as will be described further on. The use of semiotics for the production of meaning has been an interesting topic at least since the commercial advertisement "1984" produced for the introduction of Apple's™ Macintosh™ and continues to be so with some icons used in computer user interfaces (Shopping cart, folder, garbage bin). Cigarette advertising (Silk Cut™ or Marlboro™ Monument Valley plus cowboy scenery etc), and other emotionally directed advertising and publications about symbolic representations like for example the "Statue of Liberty" follow the path shown among others by the famous "1984" advertisement.
(See study "Visual Semiotics and the Production of Meaning in Advertising" published by the Visual Communication Division of AEJMC, Washington, D.C., August 1995)

Semiotics, or semiology as it is called in France, is a philosophical approach that goes beyond linguistics to interpret messages in terms of signs and symbolisms, using systems of signification. (Semiology from the Greek "semeion": sign). Signs can be conveyed by 2 D or 3D visual means as well as by acoustic and physical means like gestures, movements and any type of combinations thereof. According to Ferdinand de Saussure (Swiss linguist, 1857-1913), the term semiology can be divided into 2 components, the "signifier" and the "signified" as can be today best understood from the cigarette advertising. (See also "Clefs pour la Linguistique" by George Mounin, Seghers, Paris, 1968 and The Cognitive Semiotics of Film by Warren Buckland, Cambridge University Press, 2000). Patterns of meaning in signs can be categorized as iconic, symbolic and indexical according to C. S Pierce.

Semiotics have been known and used for various applications of in data representations. U.S. Pat. No. 5,632,009, Rao et al, discloses an indirect data representation system and method via an image table including graphical objects representing indirectly the data values in an underlying data array. U.S. Pat. No. 6,834,280, Auspitz et al, discloses a semiotic analysis system including a computer readable medium and method and consisting of a computer and a searchable database containing pieces of media. Portions of the media pieces and of the search query are associated with semiotic describers and signifiers. The describer indicates a semiotic property of the related portion, for example a relationship between portions of a media piece, or how a portion is used or interpreted or its effect. The semiotic describers in the sense of U.S. Pat. No. 6,834,280 are mostly combinations of letters in triadic relations of the object, the sign and the effect of the sign on a potential interpreter.

EP 1231544A3, Sugeno et al discloses an everyday language based computing system including a semiotic base to structure a system of meaning of the everyday language and thus generating a "translated" text.

U.S. Pat. No. 6,116,907, Baker et al, discloses a method and system to encode signs in a given sign language and represents a useful, but not really interactive solution to communicating via visual signals using two representations for a dominant and a second sign to convey content via sign language.

U.S. Pat. No. 6,584,470, Veale discloses a set or sets of signatures and signature based rules whereby a rule contains a name concatenating the signatures in the rule and relates to information retrieval (IR) systems. The document relates to the difficulty of developing systems of meaning, operating on various levels of meaning simultaneously and in natural languages. It relates more to using words or combinations of words to extract information from process words than on other semiotic means.

U.S. Pat. No. 6,636,242 B2, Bowman discloses a view configurer, basically a system and method to assign a view to a particular activity within a multilayered activity.

U.S. Pat. No. 6,275,817 B1, Reed et al disclose a semiotic decision making system which uses semiotic processing modules, a knowledge database containing information transformed into sets of symbols by the modules. The knowledge database is used to make decisions relating to queries about the information.

U.S. Pat. No. 6,394,263 B1, McCrory discloses a configurable semiotic decision making system including a sensor for sensing input data.

None of this prior art uses semiotics for interactivity such as would be applied to everyday interactive multimedia usage, none uses multilevel semiotics and none uses fuzzy logic to convey multilevel qualitative verbal descriptors. None of the prior art documents uses multilevel semiotics and fuzzy logic descriptors to relate directly the particular multilevel semiotic means or set of means, to individual levels and to the respective application and user related meanings expressed by a particular semiotic means or set of means. None of the prior art documents uses fuzzy logic descriptors to relate directly to different level user qualification signified by his use of a multilevel semiotic sign. Indeed according to the state of the art and in themselves, semiotic signs are used not at all or used very little, for example for functions beyond "drag and drop" into a "shopping cart", a "folder" or "the waste bin" as known from current single level and single meaning user interfaces.

Interactive TV (IATV) as well as interactive advertising (IAAd) is defined by a digital broadcasting and receiving infrastructure, such as a digital TV with a "set top box" (STB), together with a "return path" (cable, satellite, . . . ) for the reaction from the viewer to the broadcaster. The IATV user needs to identify an easily recognizable means to allow such return interactivity when requested from the program contents. In certain European countries, for example the UK, France & Spain, digital interactive broadcast channels use a dedicated remote control device that carries a "red button", as will be explained here after.

Advertising campaigns for IATV range from web style banner advertising to an enhanced TV style call-to-action (blinking icon) that links to a DAL, a Dedicated Advertiser Location. (Source: Interactive Television Advertising Video Vault", in Interactive TV Videos, www.broadbandbananas.com). FIG. 1 shows the current state of the art in Interactive TV advertising (IAAd) based on known Interactive TV (IATV) campaigns. The discipline of interactive advertising is used here for the simplicity of explanatory arguments, because its future developments point to increased interactive capabilities. It is also shown because the new capabilities can relate well to other interactive mixed content applications. Telescoping adverts into main content can be likened to converting linear into interactive content or creating interactive content.

An interactive application inserted into a main content according to such advertising campaigns for IATV carries built-in audio, textual or visual invitations that are supposed to lead a user to an intended interaction. Such approach has become known under the name "red button approach" and is called the "press red" behavior, because an interactive opportunity is signaled by a red button on the main content, and the user is supposed to press a specific red button on his TV remote control device to use the "return path" in order to trigger a reaction. During the interactive add appearance, the main content is usually interrupted.

FIG. 1a shows an example of a conventional red button approach. After pressing the red button, the next step is to display a "press select" command, so that a user may continue the interaction by selecting the interactive content, as shown in FIG. 1b, and the user is shown an integration box requesting the user to enter his personal data and to select, as shown in FIG. 1c. During the interactive part of some IA campaigns, the system also counts the number of connections. The user interfaces use only single level signs and commands and do not represent interactive loops as will be shown later in the description of the invention.

Other prior art user interfaces such as WO 2005/040991, Liberty et al, disclose improvements of the pointing devices, providing free space pointing capability by incorporating accelerometers into the devices. WO 2004/102522 A1, Hunleth et al disclose helically arranged menus containing lists of media items to be selected, each item being represented by a section on the 3D helical surface. The user can select items either by pointing devices or by combination of pointing and wheel devices. WO 2004/102285 A3, Hunleth et al teaches a control framework with a zoomable graphical user interface for organizing and using a number of media items coupled to an optional free space control device for pointing, scrolling, zooming and the like user interactivity functions.

None of the prior art documents uses multilevel semiotic means and multilevel fuzzy logic sets as disclosed by the present invention to provide multimedia interactivity as well as to provide a basis for a deductive, evolutionary or evidential reasoning cognitive expert system. It is therefore an objective of the present invention to use multilevel semiotic means and multilevel fuzzy logic sets to provide variable multimedia interactivity to the user as well as a basis for an expert system evaluating qualitative user behavior and decisions and providing variable content outcome based on the qualitative data.

It is further an objective of the invention to allow a great degree of flexibility in adapting to various legislations ruling the privacy of information.

It is finally an objective of the invention to present a technological solution which effectively and coherently closes the interactivity loop between the user and the application, which is simple to implement and compatible with prevailing and evolving international standards, techniques and technologies.

SUMMARY OF THE INVENTION

As described from the objectives of the invention, it becomes clear that it situates itself in the field of organizing the stream of a large variety of interactive audio and AV content, assets, digital items or other resources produced and broadcasted to the user via an equally large variety of devices. The invention of fuzzy multilevel semiotic interactivity means results in an innovative interactive user interface tool tied to a universal metadata interface tool, together called "means for interactivity" for the purpose of the following description of the invention. It also results in an innovative user interface which remains simple and coherent to the user within all the diversity of interactive content considered for the purpose of the invention.

The means for interactivity, according to the invention, may be implemented by software and hence incorporate themselves into the prevailing and evolving international multimedia standards, techniques and technologies. To date these are best represented, but not limited by MPEG-7, MPEG-21, by storage formats like AAF and MFX, document and file formats like XML for textual data, like MPEG 2, MPEG 4, or Windows Media™ Series 9.0 for still or dynamic pictures, by various open source implementations or by media sub-systems like QuickTime™ or as well as by related metadata structures like UMID, by network protocols like TCP/IP, UDP, RTP or RTSP.

Development environments and platforms like Java™ or J2ME and the like, components like applets and the like and languages like ANSI C/C++ are common in this field. Given the simplicity and versatility of the inventive means for interactivity according to the invention, applet-like applications can be written in C++, or as Applets in Java™ language.

The applications can be organized in HTML files, project files, project class files with Java™ classes for fuzzy rules, linguistic variables, result boundaries, constraints, inference, expert system frames etc to fulfill the functional requirements as will become clear from the detailed description.

The person familiar with the art of multimedia item programming will easily see that these and other software tools are readily available to produce the innovative means for multilevel interactivity according to the invention, as well as a variety core soft- and middle-wares to incorporate the functionality into interactive environments including applications on portable devices. Even though the means according to the invention will be mostly described in relation to software functionality, it might be implemented partially or totally within specialized hardware. The hardware can be CE (consumer electronics), multimedia control devices, other electronic devices or parts of devices and systems with embedded software functionality corresponding to the inventive means for interactivity using suitable support to accept and channel interactive content containing metadata interface points or other suitable "software hooks" to call on the inventive means for interactivity.

In more detail, the user interface means according to the present invention is, in fact, a multilevel semiotic and fuzzy logic interface means, the interface means providing interface to both user and metadata. In the absence of a dedicated metadata system, the user interface means according to the present invention can take the form of a simple interactive multimedia organizing metadata system. On the graphic level, the user interface is "multilevel semiotic", meaning the user addresses a selectable semiotic graphic display item as defined by the invention which offers various levels of addressability. This is the first "user interface part" of the "multilevel semiotic user interface means". These GUI means are hence linked to the user. The same GUI interface means are also linked via software to the system metadata in an interactive way, first via qualitative descriptor sets pertaining to the multilevel semiotic means. The qualitative aspect of the user interaction is translated into "fuzzy sets" meaning everyday language descriptions like "very hot", "half dead" or "somewhat interested" which are compounded into rules expressing behavioural, usage, preference, frequency, conviction and other levels of attitude or emotion that can be attributed to the user's choice by addressing a particular level of the multilevel semiotic user interface. This means that, firstly, these descriptor sets serve simply to identify the user's choices and to put a label on the choices. (He/she's doing this or that). These descriptor sets further serve to attribute meaning or "significance" to these "this or that label" or choice. The particular significance or level of significance of a choice is directly related to the importance that the user's choice has been given in direct relation to the particular application. Choosing a specific level in a particular application might mean that the customer expresses a level of interest in an advertisement, makes a choice of a medium level of information, professes a high level of knowledge in a test, expresses a particular vote in a poll, chooses a particular path in a game, a particular bet in a race or an unedited sequence in a moving pictures type of content or similar attitudes and choices in the context of any other AV content.

Hence the qualitative "descriptor sets" become the interactively meaningful link between the user and the application. This normally passes via the metadata system or other middleware. But since not everything is MPEG and hence if there may be no metadata system per se to an multimedia application, the "logic layer," as it will be explained below, becomes the de facto metadata system, it just has to be complemented by the "normal content metadata," which will relate mostly to content identity and rights.

Thirdly, these descriptor sets are tied into a qualitative logic processing system. The system of choice according to the invention is a fuzzy logic based "logic layer". A logic layer forms normally part of any metadata system and normally determines purely go-no go, or sequential choices, plus other content, author, provider and authorization related data. In the case of the present invention, the logic layer uses fuzzy logic, meaning a qualitative attribute processing logic, which turns the metadata interface into an "interactive logic content management system". This means that the system reacts logically and in an evolutionary way according to qualitative rules derived from the user's preferences, from randomly injected conditions, and from interactive opportunities offered by a respective content. The interactive opportunities offered by the content, according to the invention, are coherent with the multilevel semiotic GUI, the corresponding qualitative descriptor sets, and the rules developed in the interactive logic content management system. The GUI, the descriptor sets, and the logic are normally built in at the authoring stage and have significance with the application. They can also be retrofitted on existing multimedia content or a mixture of multimedia contents to render them interactive.

The random injections of qualitative conditions, weighing factors or other "twists of fate," serve to provide an element of surprise or suspense in order to avoid strictly evolutionary, rule based system response with corresponding boredom. Further, the experience data accumulated and contained in this logic layer, meaning the "interactive logic content management system," are used to build a kind of a personal multimedia expert system, completed by external input like SMS, blogs, podcasts, extracts of websites, and other broadcast or download information related to the application. This expert system will mainly try to achieve 3 things:

1) to give the customer what he/she seems to appreciate in a particular application, like ignoring Nike™ Ads always or preferring to watch soccer in PIP in parallel to "Desperate Housewives," if the "semiotic symbol for sports news" shows up on the screen, meaning to let him/her customize his/her use of the offering;
2) to tell the "system" (provider, set-top box, PC, AV recorder, advertiser, sponsor etc) about the preferences of the customer, meaning to help "them" to offer a customized offering; and
3) to let the user "feel" the impact of random system injections or of outside injections based for example on reactions from SMS etc or based on reactions by other players in a multiplayer environment.

This also further explains the notion of variable, or varying, content manipulation in the sense that, on the one hand, the customer has access to a variable content and manipulates its rendering interactively according to his or her choice. On the other hand, the provider (starting from the author to the access provider in the multimedia interaction chain) tries to customize the content interactively and in an evolutionary or surprising way in order to satisfy the customer and learn about and capitalize from his/her preferences. The rest is data logging and retrieval and hence supporting functions, which are not that relevant to the inventive aspect.

Thus, thanks to the present invention, it is possible to learn preferences, tendencies and habits of a user, i.e., of viewer of the multimedia representation, as well as to make more efficient use of the "return channel" of an interactive system. More specifically, in accordance with a first illustrative embodiment of the present invention, a multilevel semiotic and fuzzy logic user and metadata interface means/apparatus for varying content manipulation of an interactive multimedia representation in a multimedia system is provided, in which the multilevel semiotic and fuzzy logic user and metadata interface means/apparatus includes: (a) an interactive user interface means comprising at least one multilevel semiotic means addressable by a user and a fuzzy logic descriptor set module for storing multiple fuzzy logic descriptor sets, wherein each fuzzy logic descriptor set is related to a respective level of each of the multilevel semiotic means and describes at least one level of significance of interactivity corresponding to the respective level of each of the multilevel semiotic means, wherein the level of significance is directly related to the importance of a level addressed and thus selected by the user of the multilevel semiotic means, wherein each fuzzy logic descriptor set defines at least one fuzzy semiotic membership function definable by and based on the addressing of a level of each of the multilevel semiotic means and at least one significance attributed to the level; (b) a metadata layer for linking the multilevel semiotic means to interactivity points present in the content of the multimedia representation and defined by the metadata layer such that each level of each of the multilevel semiotic means identifies an interactivity point in the content and allows by selection of the interactivity point to perform a selectively varying content manipulation and to receive a resulting interactive presentation of content according to the selection, and (c) a user control device for addressing the multilevel semiotic means. In accordance with a second non-limiting embodiment of the invention, the first embodiment is modified so that it additionally includes (d) a logic layer for storing the fuzzy logic descriptor set module, and further storing a user preference engine that defines a user profile based on the addressing of a user of a level of the multilevel semiotic means.

In accordance with a third illustrative embodiment of the present invention, the first embodiment or the second embodiment is further modified so that it further includes a content layer for storing a content resource and access module, and wherein the metadata layer maps the interactivity points to content resources stored in the content resource and access module. In accordance with a fourth illustrative embodiment of the present invention, the second embodiment is further modified so that the logic layer further comprises a fuzzy pondering factor level comprising pondering factors, like time, duration of staying within the content of a multilevel semiotic means level, sequence of addressing a multilevel semiotic means level, and the like pondering factors, or random interjections expressed in fuzzy logic functions and applied to the interactive process between the user and the system.

In accordance with a fifth illustrative embodiment of the invention, the second embodiment is further modified so that the logic layer further comprises a cognitive adaptive multimedia expert system for evaluating the user profile. In accordance with a sixth illustrative embodiment of the invention, the fifth embodiment is further modified so that the cognitive adaptive multimedia expert system comprises: (i) a content inference module where the pre-programmed fuzzy descriptor sets belonging to the multilevel semiotic sign, to the content, and to the fuzzy pondering factors are put into context with the real time user actions and expressed as user preference rules within the context of the application, (ii) a random function generator that can inject random behavior, character compliance or defiance, surprise or tension elements, (iii) an adaptive expert system processor, and (iv) a data evaluation module.

In accordance with a seventh illustrative embodiment of the present invention, the first embodiment, the second embodiment, the third embodiment, the fourth embodiment, the fifth embodiment and the sixth embodiment are further modified so that each level of the multilevel semiotic means comprises one or more sub-levels addressable by the user. In accordance with an eighth illustrative embodiment of the present invention, the first embodiment, the second embodiment, the third embodiment, the fourth embodiment, the fifth embodiment, the sixth embodiment, and the seventh embodiment are further modified so that the multilevel semiotic means can be displayed in the interactive content.

In accordance with a ninth illustrative embodiment of the present invention, the first embodiment, the second embodiment, the third embodiment, the fourth embodiment, the fifth embodiment, the sixth embodiment, the seventh embodiment, and the eighth embodiment, are further modified so that the multilevel semiotic means can be displayed on the user control device. In accordance with a tenth illustrative embodiment of the present invention, the ninth embodiment is further modified so that the multilevel semiotic means can be downloaded onto the user control device by external communication means.

In accordance with an eleventh illustrative embodiment of the present invention, the first embodiment, the second embodiment, the third embodiment, the fourth embodiment, the fifth embodiment, the sixth embodiment, the seventh embodiment, the eighth embodiment, the ninth embodiment, and the tenth embodiment, are further modified so that the multilevel semiotic means consists of a plurality of concentric circles, each circle representing an addressable level. In accordance with a twelfth illustrative embodiment of the present invention, the first embodiment, the second embodiment, the third embodiment, the fourth embodiment, the fifth embodiment, the sixth embodiment, the seventh embodiment, the eighth embodiment, the ninth embodiment, the tenth embodiment, and the eleventh embodiment, are further modified so that the multilevel semiotic means consists of a plurality of similar shapes arranged as a Russian nesting doll, each nested shape representing an addressable level. In accordance with a thirteenth illustrative embodiment of the present invention, the first embodiment, the second embodiment, the third embodiment, the fourth embodiment, the fifth embodiment, the sixth embodiment, the seventh embodiment, the eighth embodiment, the ninth embodiment, the tenth embodiment, and the eleventh embodiment, and the twelfth embodiment, are further modified so that the multilevel semiotic means is a semiotic iconic, symbolic, indexical or other semiotic sign.

In accordance with a fourteenth illustrative embodiment of the present invention, the first embodiment, the second embodiment, the third embodiment, the fourth embodiment, the fifth embodiment, the sixth embodiment, the seventh embodiment, the eighth embodiment, the ninth embodiment, the tenth embodiment, the eleventh embodiment, the twelfth embodiment and the thirteenth embodiment, are further modified so that the multilevel semiotic and fuzzy logic user and metadata interface means is complemented or triggered by interactive exchange between user and application and between users via the application of images, music, sounds, vibrations, pressure, scents, imprints, temperature, breath and other physico-chemical expressions of emotions or other qualitative reactions. In accordance with a fifteenth illustrative embodiment of the present invention, the first embodiment, the second embodiment, the third embodiment, the fourth embodiment, the fifth embodiment, the sixth embodiment, the seventh embodiment, the eighth embodiment, the ninth embodiment, the tenth embodiment, the eleventh embodiment, the twelfth embodiment, the thirteenth embodiment, and the fourteenth embodiment, are further modified so that the multilevel semiotic means is operable to communicate with the user in spoken or otherwise sound related fashion and where the user communicates with the multilevel semiotic means in spoken or otherwise sound related fashion. In accordance with a sixteenth illustrative embodiment of the present invention, the fifteenth embodiment is further modified so that certain spoken or otherwise sound related messages are linked to a particular level of the multilevel semiotic and fuzzy logic user and metadata interface means and to the corresponding fuzzy descriptor levels.

In accordance with a seventeenth illustrative embodiment of the present invention, the first embodiment, the second embodiment, the third embodiment, the fourth embodiment, the fifth embodiment, the sixth embodiment, the seventh embodiment, the eighth embodiment, the ninth embodiment, the tenth embodiment, the eleventh embodiment, the twelfth embodiment, the thirteenth embodiment, the fourteenth embodiment, the fifteenth embodiment, and the sixteenth embodiment, are further modified so that the multilevel semiotic means is displayed for a predetermined period of time during which a user may address it. In accordance with an eighteenth illustrative embodiment of the present invention, the seventeenth embodiment is further modified so that the user preference engine is arranged to update the user profile when no level is addressed within the predetermined period of time, or when a level is addressed. In accordance with a nineteenth illustrative embodiment of the present invention, the second embodiment is further modified so that it further comprises information output means for reading the user profiles externally.

In accordance with a twentieth illustrative embodiment of the present invention, the first embodiment, the second embodiment, the third embodiment, the fourth embodiment, the fifth embodiment, the sixth embodiment, the seventh embodiment, the eighth embodiment, the ninth embodiment, the tenth embodiment, the eleventh embodiment, the twelfth embodiment, the thirteenth embodiment, the fourteenth embodiment, the fifteenth embodiment, the sixteenth embodiment, the seventeenth embodiment, the eighteenth embodiment, and the nineteenth embodiment, are further modified so that the multilevel semiotic sign includes in one of its levels an electronic address allowing a user to send immediately a voice, text, AV or combined message, preformatted or open, to the electronic address. In accordance with a twenty-first illustrative embodiment of the present invention, the twentieth embodiment is further modified so that the electronic address corresponds to an SMS, an MMS or other fixed and mobile communication address such as an e-mail, an URL or the like addressable by fixed and portable AV and text communication means. In accordance with a twentysecond illustrative embodiment of the present invention, the twentieth embodiment is further modified so that a content of the message is used as a pondering in the evaluation of the user.

In accordance with a twenty-third illustrative embodiment of the present invention, the sixth embodiment is further modified so that the cognitive adaptive multimedia expert system further comprises a data evaluation module for processing data and files related to user, content, interactivity, content resource, preferences or results of qualitative voting, betting, selecting and the like. In accordance with a twenty-fourth illustrative embodiment of the present invention, the twenty-third embodiment is further modified so that the cognitive adaptive multimedia expert system further comprises a content evaluation module for further off-line processing of the data and files processed by the data evaluation module. In accordance with a twenty-fifth illustrative embodiment of the present invention, the sixth embodiment is further modified so that a first multilevel semiotic means is provided, and once selected by the user control device, at least a second multilevel semiotic means and a number of other semiotic signs representing objects, items, situations, characteristics and the like are provided and are selectable by the user control device. In accordance with a twenty-sixth illustrative embodiment of the present invention, the twenty-fifth embodiment is further modified so that the number of other semiotic signs are also multilevel signs, wherein each respective level identifies an attribute of the item signified by the sign, an object, a character, a situation, a characteristic and the like. In accordance with a twenty-seventh illustrative embodiment of the present invention, the twenty-fifth embodiment or the twenty-sixth embodiment is further modified so that the number of other semiotic signs correspond to actual objects and the like existing in the content. In accordance with a twenty-eighth illustrative embodiment of the present invention, the twenty-fifth, the twenty-sixth and the twenty-seventh embodiments are further modified so that the cognitive adaptive multimedia expert system further comprises a content resource and access module for generating different episodes and outcomes as a function of the selected objects. In accordance with a twenty-ninth illustrative embodiment of the present invention, the twenty-fifth embodiment, the twenty-sixth embodiment, the twenty-seventh embodiment and the twenty-eighth embodiment, are further modified so that the objects are linked to the at least second multilevel semiotic means, as a function of which a corresponding fuzzy logic descriptor set is arranged to define a corresponding fuzzy semiotic membership function based on the selection and linkage of the objects between the first and at least second multilevel semiotic means. In accordance with a thirtieth illustrative embodiment of the present invention, the twenty-fifth embodiment, the twenty-sixth embodiment, the twenty-seventh embodiment, the twenty-eighth embodiment, and the twenty-ninth embodiment, are further modified so that the cognitive adaptive multimedia expert system is arranged to analyze the corresponding fuzzy descriptor sets which result from the users choices as well as some fuzzy pondering factors and user preference rules established by the content inference module so as to address the content resource and access module.

In accordance with a thirty-first embodiment of the present invention, the first embodiment through the thirtieth embodiment are further modified so that the multimedia representation is a documentary, a docu-fiction, an interactive AV representation or the like. In accordance with a thirty-second illustrative embodiment of the present invention, the first embodiment through the thirty-first embodiment are further modified so that the multimedia representation is a game. In accordance with a thirty-third illustrative embodiment of the present invention, the thirty-second embodiment is further modified so that the game is a multiplayer game, having a first player that is the user of the user control device, and having a second player that is virtual. In accordance with a thirty-fourth illustrative embodiment of the present invention, the thirty-second embodiment is further modified so that the game is a multiplayer game, having a first player that is the user of the user control device, and having a second player that is a second user. In accordance with a thirty-fifth illustrative embodiment of the present invention, the twenty-fifth embodiment, the twenty-sixth embodiment and the twenty-seventh embodiment are further modified so that the meanings of the second multilevel semiotic means relate to surprise, danger, comfort, state of mind, physical conditions, mental preparedness, level of security, and the like, attributes and conditions and wherein the meanings relate to the content as well as to the user or external factors. In accordance with a thirty-sixth illustrative embodiment of the present invention, the thirty-second embodiment, the thirty-third embodiment and the thirty-fourth embodiment are further modified so that the meanings of the second multilevel semiotic means express attitude, character or role aspects of the user and at least a second player in the game.

The inventive means for interactivity will become clear from the following detailed description of the core and the embodiments of the invention.

BRIEF DESCRIPTION OF THE DRAWINGS

The invention is now depicted in the following figures, which are described in detail further on.

FIG. 2 shows, in FIGS. 2a to 2f, a schematic overview of key principles of the invention: Explanation of multilevel semiotic user interface with multilevel fuzzy descriptor sets and its control.

FIG. 3 shows a multilevel semiotic user interface with multilevel fuzzy descriptor sets and interface to metadata layers and to a cognitive adaptive multimedia expert system. This shows a first preferred embodiment of the multilevel semiotic interactive user interface according to the invention relating to advertising content inserted into the main content.

FIG. 4 shows a multilevel semiotic interactive user interface for interactive documentary gaming and playing content. This shows a further preferred embodiment.

FIG. 5 shows, in FIGS. 5a to 5d, a schematic overview of a multilevel semiotic interactive user interface for gaming, selecting, betting, voting, searching & similar applications. This shows another preferred embodiment relating to content implying qualitative search, selection, negotiation or decision-making.

DETAILED DESCRIPTION OF THE INVENTION

Figure 1A:
FIG. 1 shows an example of a current state of the art application: Interactive advertising (IAAd) on Interactive TV (IATV) using the "red button" approach.

FIG. 1, described above, shows in detail the present state of the art of interactivity based on interactive advertising. The discipline of interactive advertising is used here for explanatory reasons because its future developments point to increased interactive capabilities and because the capabilities can relate well to other interactive mixed content applications. FIGS. 2a to 2f show in detail the principle of the invention, a multilevel semiotic user interface with fuzzy descriptor set, interface to content metadata and to expert system data file.

A detailed description will now be explained in 5 parts of interactivity functionalities and system interactions as shown in, but not limited to, the following descriptions:

Part I:
   Multilevel semiotic means

Part II:
   Fuzzy semiotic expressions and fuzzy semiotic descriptor set
   Embedding the multilevel semiotic means and fuzzy semiotic descriptor set as a user interface into the metadata system Part III:
   User/System interaction
   User interaction with a current state of the art interactive application
   User interaction with the inventive multilevel semiotic means
   Interactive system reactions to qualitative input using fuzzy semiotic descriptors
   Interactive multilevel semiotic system reactions to user actions
   Qualitative input of user attitude using the multilevel semiotic means
   Interactive system reactions to qualitative input using fuzzy semiotic descriptors Part IV:
   Structure of the cognitive adaptive multimedia expert system Part I: Multilevel Semiotic Means FIG. 2a summarizes the aspect of the graphic user interface using multilevel semiotic means 110 as well as the standard components of an interactive system as used by the viewer. The multilevel semiotic means be displayed in several manners, for example, as shown as a set of concentric circles like in FIG. 2a. Examples of semiotic means that may be used instead are shown in FIG. 2b.

FIG. 2b also shows the innovative semiotic aspect of the multilevel semiotic means, according to the invention, which implies for example that a variety of semiotic signs (110), iconic (101), symbolic (102) or indexical signs (103) may be used as a first constituting element of the semiotic user interface. In the particular context, a sign is not necessarily limited to the visual category of signs or known semiotic definitions.

An example of a multilevel iconic sign is shown in the top image of FIG. 2b, where a representation of a dog is used as the iconic semiotic sign 101. The multiple levels of this signs may be defined by the tail, the ears, the legs or the paws, where each level represents a potential level of interest of the user and a potential meaning for the interactivity like running for legs, emotions for tail, sniffing out for nose and the like. Each of these semiotic meanings might have different levels of meaning. For example, the nose might move faster and the sound of sniffing might be added if the interactive search action becomes more "intensive", whereas it might not move at all if there is "nothing there".

An example of a multilevel symbolic sign is shown in the middle image of FIG. 2b, where a representation of a heart is used as the symbolic semiotic sign 102. By providing several hearts within a heart, in the way of a 2D or 3D Russian nesting dolls, several levels of meaning can be established.

An example of a multilevel indexical sign is shown in the bottom image of FIG. 2b where a plurality of concentric circles is used as the target-like indexical semiotic sign 103. As already mentioned, each circle represents a level of the multilevel sign, similar to the hearts described above. Indeed, according to the invention, signs, images, sounds, words, movements, positions of objects, hidden objects and the like can be used, alone or in combination, for the function of multilevel visual semiotic user interface.

Iconic signs look, sound or smell directly like what they represent; some well-known examples are visual signs like folders, garbage bins and shopping cart icons in today's PC graphic interfaces. Symbolic signs carry a meaning that is often established by convention, by cultural implication, by tradition and the like and are often visual. Well known symbolic examples are the heart shape as a sign for love, the Statue of Liberty, but also certain songs, poems or sayings as signs for independence, the Yellow Rose of Texas sign and song for a US State, the Eiffel Tower, as well as posters or songs by certain artists as signs for Paris, or "thumps up" for optimism or "OK", the latter being in itself a semiotic symbol.

In conventional applications, for example, in interactive advertising (IAAd), as shown hereafter with reference to FIG. 1, a single level "red button" sign is used as an invitation for viewing interactive advertising opportunities such as "press red button now". Symbolic signs hence can be at least visual- and sound-based as well as combinations of the two and other means of expression as long as they are symbols for something.

Indexical signs carry clues that link them to a real object, state, phenomenon and the like. "Fortune cookies" may be a semiotic sign used to convey hidden messages and may have different depths or levels for a message or messages. Well-known indexical signs are "smoke" as a sign for fire, a sign that exists also in the form of linguistic expressions in some cultures. Certain sounds like finger snapping or movements like "thumps up" (again) are indexical semiotic signs.

A shape, outline and levels of an outline of a multilevel semiotic means, according to the present invention, can be spatial, 2D or 3D, temporal, it can be sound or other sequence based like movements, gestures, colors or differences in properties of external semiotic supportive materials or media, like texture, liquids, scents, resistance and the like. It can be the wagging of a plush dog's tail in response to a related interactive part of a multimedia content being played on a connected IA system, including the same action performed by the animated version of the plush dog "inside" the multimedia content.

In the simplest form the multilevel semiotic means, according to the present invention, can be of a generally known geometric shape, outline or contour. In general, the geometric shape or contour of the multilevel semiotic means will be chosen within the context of the respective interactive content. All cultural, national, regional, language communities and the like have such signs, often with distinctive meanings for the same semiotic sign. The frontiers between the definitions of particular semiotic signs are sometimes blurred. Some signs can carry radically different meanings in different cultures.

Thus, such multilevel semiotic means according to the invention can be adapted, meaning localized, with regards to different cultural, national, regional, language communities and the like. They can be used to convey the same interactive message of or within a content by using the correct semiotic sign or by creating an adapted one which corresponds to the different cultural, national, regional, language communities and the like.

FIG. 2c takes the multilevel aspect applied to an indexical semiotic sign as an example. The multilevel aspect is expressed here by the individually addressable levels or regions, represented here by a plurality of concentric circles

110*a*, 110*b*, 110*c*, 110*d* and 110*e* of interactivity within the multilevel semiotic sign. Each level can be addressed by a user using an appropriate interactive control device 2, such as a remote control, a joystick, a mouse, a PDA, a mobile phone, a keyboard or the like. The multilevel aspect is further shown in more detail in, but not limited by, FIG. 2*c*. Each level, i.e., here each circle, has at least two distinct significance levels indicated by reference numerals 110*a*1, 110*a*2; 110*b*1, 110*b*2; 110*c*1, 110*c*2; 110*d*1, 110*d*2 and 110*e*1, 110*e*2 where a first significance level 110*a*1, 110*b*1, 110*c*1, 110*d*1 and 110*e*1 is user related and represents an input from the user to the system, and where a second level 110*a*2, 110*b*2, 110*c*2, 110*d*2 and 110*e*2 is content related, i.e., represents an output from the system to the user (for example a content change as a function of the user choice of a level of the semiotic sign).

The multilevel aspect of the semiotic sign relates which possibilities to depict differences in, enhancements or increase of meanings between levels of the multilevel semiotic means as expressed to the user by systems of signification like:

- a changing of signs like through a combination of textual or graphical symbols;
- a graduation of color within a sign or a change of colors or color intensity, the color itself representing a semiotic message or meaning;
- a change in display of the sign like vibrating, blinking, dancing and the like;
- a change in display of the sign vibrating, blinking, dancing and the like to a fixed or musical rhythm or tune, wherein the vibrations, rhythm, music and the like represent themselves a semiotic message or meaning;
- a change in intensity and the speed of sounds, notes, sound, verbal or musical messages accompanying a sign;
- a change in movement like tail wagging or morphing like in case of the nose of the dog in FIG. 2*b* and as explained above or a gesture like waiving to come or good bye;
- a combination of any of the above and other indications of change of state and meaning related to the particular multilevel semiotic sign;
- differences in properties of external semiotic supportive materials or media or parts thereof, like solids, liquids or scents, like books, like toys, and properties like smell, resistance, vibrations, texture, temperature, humidity and the like.

The innovative semiotic aspect of the multilevel semiotic means according to the invention is hence described partially in FIG. 2*d*, but not limited to the features that:

a) The multilevel semiotic means has a first level of meaning related purely to its own implied significance (210). Such first meaning can relate, for example, to the fact that the sign is "in context" or "out of context" with the main content." "In context" may mean "in direct relationship" with the "linear main content" like an interactive excursion of the same main story. It gives a set of meanings and, in parallel, a set of addresses to content(s) introduced by the multilevel semiotic means within the application metadata framework.

b) The multilevel semiotic means has at least a second level of meaning (220) related to the identity of the interactivity potential, to a content portion, to representations, episodes and the like relating to a character, a subject, an advert or theme within the content and the like, and that c) The multilevel semiotic means can appear in conjunction with other semiotic signs, like a sound, a jingle, a musical piece, a different or similar visual sign, for example, a logo, a "button", colors and light ambiance relating to the interactivity potential, to a content portion, to a character, a subject or theme within the content and the like, and that d) It can relate to interactive commands given by the user, to qualitative decisions made by the user with regards to using or not the interactive content, the content portion or subject and the like and to correspondingly evolving qualitative appreciations made by the interactive content logic with regards to the user, and that e) It can contain different individual levels or regions of interactivity to form the inventive multilevel semiotic interactive set (FIGS. 2*c* and 2*d*: 110*a*, 110*b*, 110*c*, 110*d*, 110*e*), and that f) The particular levels or regions of interactivity can use, as shown in FIGS. 2*c* and 2*d*, the region 110*a* immediately outside, but in close vicinity to the multilevel semiotic means, and that g) This region 110*a* immediately outside, but close to the multilevel semiotic means can be equally interactive as the regions 110*b*, 110*c*, 110*d* and 110*e* that are represented in between the different shapes or outlines from the outermost to the innermost outline of a particular multilevel semiotic means 110 expressed by a particular shape or contour, and that h) As shown in FIG. 2*d*, this immediate outside region 110*a* as well as the inside regions 110*b*, 110*c*, 110*d* and 110*e* of the multilevel semiotic sign carry at least a second level of meaning (220) additional to the first level (210), and that i) This second level of meaning (220) is composed of particular multilevel significances related at least to choices offered to the user for addressing them hence related to the interactive content itself as shown in FIG. 2*d*, by way of the second significance level, and that j) This immediate outside region 110*a* as well as the inside regions 110*b*, 110*c*, 110*d* and 110*e* of the multilevel semiotic sign carry at least a third level of meaning (230) related to choices that the user makes and to the interpretation that the system makes related to making those choices or ignoring their opportunity.

k) These significance levels can relate to conditions or requests put forward to the user by the content, to attitudes or choices that the user makes with regards to the content and the like interactive behavior, control and content flow, and that l) The particular levels or regions of interactivity can each relate different levels of significance or meaning implied by the multilevel semiotic means itself, and that m) The particular levels or regions of interactivity can each relate a different meaning related to the other levels or regions of interactivity and to the significance meaning implied by the multilevel semiotic means itself, and that n) The meanings can at least relate to
choices made by the user before approaching, using or playing a particular content as well as to preprogrammed changes in or within the interactive content presented to the user and reacting to choices made by the user, and to the context of that content related to the main, linear content enhanced by the interactive content that can be called upon by the multilevel semiotic means.

o) As shown in FIG. 2*d*, the multilevel semiotic sign related to the interactive user action related meanings (230), same as the first 2 levels, can be expressed by fuzzy descriptor sets and directly converted to fuzzy membership functions as shown in FIG. 2*e* and as will be explained further on.

p) As further shown in FIG. 2*d*, the levels of meaning (210, 220 and 230) are complemented by an additional level (240) corresponding to pondering factors, like time, duration of staying within the content of a region, sequence of addressing the regions, and the like, pondering factors or random interjections expressed in fuzzy logic functions and applied to the interactive process between the user and the system, and that q) The multilevel semiotic means according to the invention can, as shown in the example of FIGS. 2b and 2d, incorporate and combine one or a variety of different multilevel semiotic means with one or a variety of additional meanings in order to render a composite multilevel semiotic meaning, and that r) Such composite semiotic meaning can be related to searches, decisions, choices, attitudes, a mixture or mixtures thereof conveyed by the user to the system or by the system to the user and to variations thereof in iterative episodes, and that s) The multilevel semiotic means according to the invention can at least relate a further set of meanings or significances also attached to the levels of the multilevel semiotic means, including the inside levels and the immediate outside level.

In a preferred embodiment of the multilevel semiotic means, a geometric shape or contour can be shown in a very discreet manner, so as to simply attract momentary attention to an interactivity point without disturbing the main content. In a further embodiment, it may be located in an ergonomic fashion at the upper right hand side of the display but it can be positioned elsewhere on a screen and it can be as large as needed to allow reliable addressing depending on the display and the content.

In other preferred embodiments and according to the respective legal environment, the multilevel semiotic means can also relate to real objects, items, brands, logos, moods, context, personal representations and can be shown as shapes, contours and the like, representations including 3D semiotic signs as further shown in FIG. 2b. In other preferred embodiments, it can be a combination of more than one semiotic sign of different characteristics like size, shape, meaning, type, and the like. Such combinations of more than one semiotic sign can thus carry composite meanings. In other preferred embodiments, like games or plays, the multilevel semiotic means can be a non-playing character, item or object relating to the content, the user or the users like a user alias and feature a particular change in shape, color, sound or other signs that indicate the levels of meaning relating to that particular multilevel semiotic means. In other preferred embodiments, if the user chooses to ignore, hence not to address the particular interactive opportunity offered by the region immediately outside, but close to the multilevel semiotic means, the multilevel semiotic means attributes a particular meaning to that choice. In other preferred embodiments, several multilevel semiotic means are used to convey a search, a choice, an attitude, a feeling, opinion and the like of the user or attributed to a character, scene, object, theme and the like parts of the interactive content.

In a particular preferred embodiment, the multilevel semiotic means are invisible to the user but linked to other visible semiotic signs within the content and to the content metadata. In other preferred embodiments, a particular multilevel semiotic means according to the invention can hide at least another multilevel semiotic means at any of the levels of the particular multilevel semiotic means. In other preferred embodiments, the degree of importance of meanings can go from the outside inwards or the inside outwards according to the definition levels of the multilevel semiotic means and depending on conditions favorable to the content and the logic of use. In other preferred embodiments, the degree of importance of meanings can go at random from the outside inwards and the inside outwards according to the definition levels of the multilevel semiotic means and depending on conditions favorable to the content and the logic of use. In other preferred embodiments, the multilevel semiotic means itself and the levels or regions of interactivity levels, including the inside levels and the immediate outside level, can carry more than one meaning per semiotic level and are tied to more than one fuzzy logic descriptor set per semiotic level. In other preferred embodiments, the multilevel semiotic sign itself and the levels or regions of interactivity levels, including the inside levels and the immediate outside level, can change as a function of the evolution of the content, of the appreciation of occurrences or changes in the users attitudes, preferences and interactivity patterns.

A main aspect of the present invention hence resides in the fact that more than one set of different meanings can be attached to a single set of levels of a multilevel semiotic means, which in turn can be tied to more than one fuzzy logic descriptor set. These sets of meanings relate at least to the semiotic sign itself, to the inside levels and to the immediate outside level of the semiotic sign as well as to meanings related to the user and to the content, and, without limiting the scope of the invention, to these types of meaning related by the multilevel semiotic means.

Hence as shown in, but not limited by FIGS. 2a to 2d, the innovative multilevel semiotic interactive means according to the invention makes it extremely flexible, simple and attractive to structure a large variety of interactive content from linear contents. These means also allow one to adapt interactive content originated from one region or culture to viewers from a different region or culture and relate to them in the way of their own signs. They also allow securing the use of the content by providing innovative means to connect particular multilevel semiotic means to authenticity related metadata.

Part II:

In continuation of the first part, the fuzzy logic aspect will now be described in more detail. The use of fuzzy logic in combination with the multilevel semiotic signs allows one to define fuzzy semiotic membership functions. These membership functions can relate to user profiles belonging to a certain category of viewers reacting or not to an advert, they can relate to an appreciation of choices made by a player in a game and to qualitative decisions made by a player in a betting, voting or other selecting application. Thus, a further main aspect of the present invention is the emergence of innovative Semiotic Fuzzy Descriptors attached to the multilevel semiotic signs and their meanings, expressed as membership functions.

Fuzzy Membership functions arise normally out of the so-called fuzzification (transformation) process. In this process, ranges of numerical values expressing a condition or phenomenon like "45 to 60 year old" are defined with regards to a linguistic expression like "middle-aged", as shown in FIG. 2e. In fuzzy logic terminology, this linguistic expression is called a "membership function". As a classic example, a membership function "middle-aged" can then be used to create rules defining which person is more or less middle-aged.

As shown in FIG. 2e, the rule "A person is middle-aged" can be expressed in a membership function including a degree of belonging, called a "degree of confidence," with which a particular person belongs to the membership function. For example, depending on the degree of belonging, i.e., in this case depending on his age, a person can be categorized in one of the shown categories: "somewhat middle-aged", "middle-aged", or "somewhat older". Conversely, as shown in FIG. 2e, the same type of membership function can be applied to the degree of belonging to "somewhat interested", "interested", "very interested". It is hence easy to correlate the sense and procedure of the age related membership function and fuzzification to the level of interest membership function as related in FIG. 2d, Level 3 (230), user related meaning.

For the purpose of the present invention and related to the innovative use in semiotics, the fuzzy logic membership functions will be called "fuzzy logic semiotic descriptor sets" in the following text and figures. The fuzzy logic aspect of the multilevel semiotic means according to the invention is described but not limited by the features that:

a) The fuzzy logic aspect is the direct fuzzy logic conversion from semiotic meaning to fuzzy logic semiotic descriptor sets expressed as membership functions.

b) As shown in FIG. 3, interactive commands given by the user and qualitative decisions made by the user by addressing the multilevel semiotic means 110 are tied to the digital content metadata at a suitable layer, for example, the presentation layer 10 and the logic layer 20.

c) As also shown in FIG. 3, the corresponding qualitative appreciations made by the interactive content logic with regards to the user are transcribed directly at the authoring stage as a fuzzy logic descriptor set module 200 into the digital content metadata again at the suitable layer, for example the logic layer 20.

d) As previously shown in FIG. 2d, the fuzzy logic descriptor set module 200 in FIG. 3 correlates to the various levels of meanings of the multilevel semiotic means, these levels of meanings being applied to the sign 210 itself, to the content 220, to the user 230 and to the fuzzy pondering factors 240.

e) As shown in, FIGS. 2d and 2e, and according to a further aspect of the present invention, the emergence of membership within levels of fuzzy logic semiotic descriptor sets is directly determined by addressing the related level of the multilevel semiotic means, with this level ranging from the region outside of the multilevel semiotic means to the region that is innermost of the multilevel semiotic means.

f) As shown in FIG. 3, the fuzzy logic descriptor sets contain more than one type of fuzzy logic descriptors related to the more than one level of meaning attached to a particular multilevel semiotic interactive set.

g) As shown in FIGS. 2d and 2e, the degree of belonging to a particular membership is expressed in the way intended by the authors of the story, for the so-called genetics of the play, game, tutorial, clip, advert etc. For example, as shown in FIG. 2d, the interpretation of the user addressing or not different levels of meaning of the multilevel semiotic means, can be expressed as a function of the user's interest in a particular interactive offering, for example, a news clip or an advert or something totally different because of its particular relationship to a content, part of a content, in context or imported.

h) As known by the person skilled in the art, the fuzzy logic functions can be of considerable variety, will not necessarily be linear, are very flexible regarding the range and form of evolution and variability and can relate to the point of view of the interested content creator and user.

i) In an additional aspect of the invention and as indicated by FIGS. 3 and 2d, time, duration, sequence and the like can be additional elements of the fuzzy descriptor sets, to influence the "fuzzy pondering factor" (FIG. 2d, 240 and FIG. 3, 240) allowing among others to consider the speed or hesitation with which different users make identical decisions in the sense of choosing to address the same level of the multilevel semiotic means. For example, if a user reacts immediately to an interactive opportunity, the system can interpret this as meaning that the user is "very interested".

j) In one preferred embodiment of the invention the fuzzy pondering factors and, as indicated by FIG. 3, the same or a different time or other cognitive and modulating factor can be embedded for each level of the multilevel semiotic means and transcribed as fuzzy pondering factors relating to the application but not visible in the multilevel semiotic means itself.

k) In one preferred embodiment, for example, a game, a particular time, as indicated by the game clock needed to perform an action, could be interpreted as "careful" or "careless," and would apply to provide different outcomes to different players, to rate players, betters and the like.

l) In one preferred embodiment, for example, a game, a duration taken to perform an action could be interpreted as made by a "fearless" or "hesitant" gamer and would apply to provide different outcomes to different players, to rate players, betters and the like.

m) In another preferred embodiment, for example, an interactive advert, the time needed to respond to a question could be interpreted as "familiar with the product" or "new to the product" and the resulting membership functions would apply to provide different evaluations of an ad campaign, to rate user response, and the like, via a cognitive adaptive multimedia expert system 250 described further on.

n) In another preferred embodiment of the invention, a semiotic symbol for time can be shown in conjunction with the multilevel semiotic means 110.

o) In another preferred embodiment of the invention, as shown in but not limited by FIG. 3, the sequence with which the user addresses the different meanings of a multilevel semiotic means or the fact that the user ignores or addresses one or a few of the different meanings of a multilevel semiotic means in a preferential way, can also be applied as fuzzy pondering factors 240.

p) In another preferred embodiment of the invention, as shown in but not limited by FIG. 2d, other aspects of interactivity between the user and the system can be transcribed into fuzzy pondering factors 240. For example, ratings or evaluations depending on the pondering factors can be carried out. This may provide feedback to a user, but could also be used to provide feedback to, for example, a company that uses a multilevel semiotic means to display an interactive advertisement opportunity.

q) In a further preferred embodiment, and as shown in FIG. 2f, using the example of a multilevel indexical semiotic sign using, for example, concentric circles for representation of levels of meaning can be transferred and addressed directly to the control device. This feature can be permanent or downloaded depending on the type of control device, PDA, mobile phone, dedicated device and the like.

r) The fuzzy pondering factors can be or relate to semiotic, semantic, behavioral, numerical, spatial, directional and other factors that can modulate a meaning, an action, a reaction, a behavior, an evaluation, and the like in the sense of the invention.

s) As can be understood by the person skilled in the art, these "fuzzy pondering factors" can be transcribed into fuzzy terminology, for example, as more or less of a time measure or duration or more or less of a quantitative or numerical value or characteristic and transcribed functionally into the application as well as processed with the fuzzy logic descriptor sets.

t) As shown further in FIG. 3, the contents of the Fuzzy Descriptor Set Module 200 in FIG. 3 are used according to the particular interactive content in a User Preference Engine 260a within a Content Inference Module 260 also interfaced to the Logic Layer 20.

u) The User Preference Engine 260*a* creates a file of "If, then." or other occurrence based, deductive or evolutionary rules based on the use of the multilevel semiotic means by the user, the fuzzy descriptor sets corresponding to the various levels, the corresponding membership functions and the fuzzy pondering factors. The further use of these modules and their content in the processor (270) of the cognitive adaptive multimedia expert system (250) will be disclosed in the subsequent parts of the Description of the Invention.

As mentioned, logic layer 20 also comprises a content inference module 260 for storing user preferences in a so-called user preference engine 260*a*, by using, for example, if-then rules, to establish a certain preference as a function of a certain interaction based on experience or evidence. As such, one content instead of another may be proposed to a user as a function of her/his preferences. Logic layer 20 is further linked to a content layer 30 in which all content resources are stored, and access links thereto. Thus, content layer 30 comprises a content resource and access module 310 to this effect. Content layer 30 further comprises information about content rendering related to the content that is be rendered, such as the position on the presentation layer and the instant of rendering the content. As can be understood by the person skilled in the art, the invention cannot be limited to the description but is much broader in scope in its application to the field of interactive multimedia. The multilevel semiotic interactive user interface 110 including a fuzzy descriptor set 200 as an interactive interface to the digital content metadata at a suitable layer, for example, to the logic layer 20 having been disclosed thus far, the interaction between the user and the interactive multilevel semiotic and fuzzy logic user and metadata interface will now be described.

Part III: User/System interaction

Further to the first part and the second part of the detailed description of the present invention, the description of interaction between the user and the novel interactive multilevel semiotic and fuzzy logic user and metadata interface now discloses the resulting innovation in the domain of interactivity. The present inventors considered that an interactive system has at least 7 participants:

a) The user, meaning a viewer, a gamer, a better, a buyer, a reader, a student and the like using an interactive content,
 b) The interactive content itself,
 c) The author, designer, responsible editor, director and the like,
 d) The Producer, e) The Publisher,
 f) The Provider, and g) The Sponsor.

According to the respective business configurations, some of these participants can play more than one of the participant roles.

The inventors sought to address the needs of these various participants through the interactive multimedia system, according to the invention, by the innovative features of the multilevel semiotic and fuzzy logic user and metadata interface means as well as by the interactive addressing, qualification and evaluation means with system learning capability. Interactivity interfaces, such as shown in FIG. 1, relating to the conventional art are very often limited to VCR type control means, picture in picture (PIP) presentations and to STB (Set Top box) like single choice "click to select" icons without on-line means to interpret the choice of the user and without constituting a real interactive user/system loop. The STB systems do not always have memory capacity for downloading digital content, often the TV itself is analog.

Hence the main content will continue in the background if the user decides to follow the invitation to "Press red button now" indicated by a blinking single level icon. The user communicates with the STB, not with the blinking icon. The interactive "intermezzos" which are provided often contain sponsoring content. This system represents a common TV based level of enhanced on-line subscribing and purchasing means known from the Internet world and, as such and as suggested by FIG. 1, are considered part of the prior art in the sense of the invention. They are mostly conceived to identify the "qualified customer" through the recording of his/her identity and purchasing activity. Information about any other activity or qualitative interpretation of such activity is not available and hence is not used.

Figure 1B:
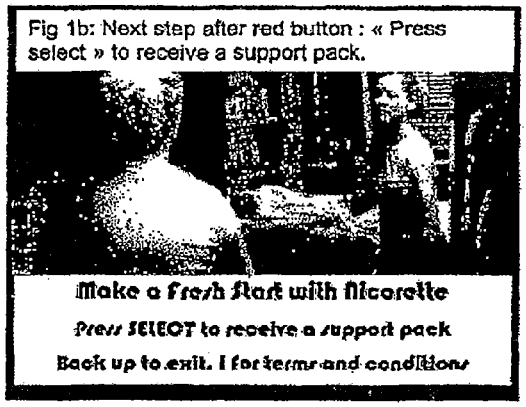
Figure 1C:
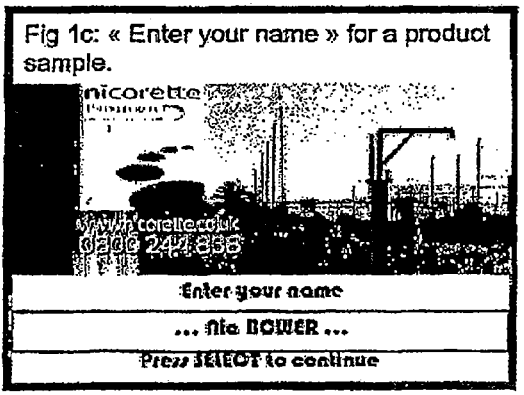

The shortest stories with the biggest point to point communication risk are probably advertising clips as attached to, inserted into, or telescoped into, main content for the large variety of existing and coming fixed, wired, wireless, nomad, portable and on-board devices, such as defined in the present invention. In state of the art analog TV and STB without memory, such as shown in FIG. 1*a*, an interactive opportunity is signaled to the user by a blinking single level icon during a normal advert located in a standard fashion within a main content. The interactive opportunity is often related directly to an advertising purpose. It is signaled by a textual or sounded "invitation to press a red button" on the control means, which according to FIGS. 1*b*, 1*c*, and 1*d*, leads the user to look for more and possibly register for a deepened relationship with the advertiser. The main content is not stopped beyond the duration of that normal advert occurrence, but continues if the user has decided to look for more and follow the instructions of the interactive opportunity. In PIP configurations, the user will be able to watch both the continuing main content and the content offered by the interactive opportunity.

Thus, in state of the art analog TV, same as in digital TV with VoD and certainly with the advent of PVR, two antagonistic tendencies seem to develop, the first tendency being for adverts to try to "telescope into", meaning to extend beyond the classic 30 second time frame, and to provide a message style looking sort of like a "content within a content". The second tendency, especially in the case of PVR, and other similar downloads to fixed or portable communication devices, is for users to try and not view adverts at all. The inventors conceived a novel approach to this problem that not only solves this "go-no-go" situation, but also furthermore benefits both the user and the content providers in an innovative way and which can work in both the analog and the digital world.

The present invention can function work with the state of the art described in FIG. 1. In a corresponding first preferred embodiment, "the invitation to press a red button" and as previously shown in FIGS. 2*a* and 2*f*, can be represented by the appearance on the viewing screen and also on the screen of the control device of a multilevel indexical semiotic sign, like concentric red circles inserted into the linear content, into a standard 30 second advert or another interactive application. In the case of the "red button" pressing, pointing is not possible, so the choice of the level within the multilevel semiotic sign has to be made by several clicks, for example, one click for the outside region, two for the first inside region, and so on, or by the use of the digit keys on the remote. Hence, by using the "red button" on the control means for the first time, the user will be informed in a general manner about the proposed interactive content, such as an advert according to FIG. 1. The user then has the choice to do nothing and continue to watch the normal 30-second advert content, which of course will get him/her back to the main content. By using the red button one or more times after receiving the general information, the user will address the various levels of the multilevel semiotic means by subsequent clicks or selections and receive the corresponding level of interactive content. By addressing any of these levels a second time while being in it, or by using a specific available command, the user may leave that particular level of interactive content and return to the main content.

The applicable semiotic descriptor means, as described in detail above and related to the activity and application described above by FIG. 1, might be located and stored in the STB for retrieval as desired by the provider and used to deduct user preferences off-line as desirable and allowed by the applicable legal environment. In the sense of the invention, the STB hard- and software environments serve a similar, albeit less extensive function, as can be provided by the metadata system of a full digital content or MPEG 21 environment. The person skilled in the art will realize that the invention will adapt to a variety of states of the art, from intermediary as shown by FIG. 1, to the extensive multilevel interactivity applications as will be disclosed further-on.

FIG. 3 shows a further particular preferred embodiment of the interactive multimedia system according to the invention in the context of digital TV and an advertising content inserted, and possibly telescoped, into the digital main content and including the interface to the interactivity metadata means. As shown in FIG. 3, the interactive control devices used can be of some variety. However, in a most preferred embodiment of the interactive multimedia system according to the invention, the multilevel semiotic addressing functionality is downloaded via the STB, via a memory stick, via Internet, or simply via mobile telephone service, into the control device, which could be a mobile phone, a PDA or a dedicated control device having the required memory, display and connectivity functionality. The invention does not depend on a specific addressing technology, but offers innovative features to existing communication devices as described earlier on.

Hence, control devices without sophisticated free-space mouse-like pointing, scrolling and zooming capabilities as described previously, may also be used for the innovative multilevel semiotic user interface. In one preferred embodiment, as previously indicated in FIG. 2f, the multilevel semiotic user interface and the display on the control device replicates the semiotic sign shown on the screen and the user can chose to address or not the various regions of interactivity with a few thumb strokes as used for SMS (Short Message Service) text messages, MMS (Multimedia Message Service), or other fixed and mobile communication messages, broadcasts and downloads.

In another preferred embodiment and as indicated by FIG. 3, the multilevel semiotic sign includes, for example, at its most important level an SMS, MMS or other text and AV message forms to a website, a blog, a podcast or other communication site addressable by fixed and portable AV and text communication means address, which lets the user, by clicking on the "yes" or "OK" button, for example, to send immediately such a message. The content of the different message forms may then be used later as a pondering factor in the evaluation of the viewers use of the interactive opportunities as shown for the content evaluation module 320 in FIG. 3. The same can be true of course for phoning or e-mailing in messages that correlate to the application.

To further explain the user interaction with the inventive multilevel semiotic means, FIG. 3 represents the example of a frame relating to the broadcasted content of a Formula 1™ racing event with a simulated insert of a multilevel visual semiotic user interface indicating an interactivity potential, in this case an advert. As shown, a racing event is displayed as the interactive content. At a certain moment in time, a multilevel semiotic means 110 is displayed in a frame of the main content to provide an interaction opportunity to a viewer.

For the purpose of the invention, the displayed main content frame could also be taken from a movie, tutorial, game, documentary or real-time transmission of a F1™ racing event or episode. For the same purpose, it could also be taken from a movie, tutorial, game, documentary or real-time transmission about any other subject, different from F1 ™ racing. Addressing can be made by clicking, pointing or other commands, like keyboard, text, voice or visual or other interfaces or commands, as made possible by addressing technology by using suitable user-interface addressing means. Point and click commands are the most common addressing means currently known in personal computers, PDAs, mobile phones, PVRs, advanced STB and game consoles.

In a few other cases, for example, some mobile phones and PDA's and control devices for some STB these commands are possible via clicks of the linear cursor displacements (up, down, left, right) plus OK button to confirm a particular choice. In most, if not all, cases of PC based and up-to-date VoD, PVR, media center equipment, game consoles etc pointing to and clicking on the levels of a semiotic sign is a built-in feature.

According to the invention, addressing the immediate region outside, but close to the multilevel semiotic means, can carry two meanings within the first set of meanings:
(1) If ignored, not addressed, the meaning expressed in the related fuzzy semiotic descriptor set is that to "no-interest" indicated by the user.
(2) If addressed, clicked on or otherwise, it can mean that the user wants to check out what's behind the multilevel semiotic means.

This was previously shown in FIG. 2d and will be expressed correspondingly in the related fuzzy semiotic descriptor set by updating the user profile defined by the descriptor set. Addressing other levels or inside regions of the multilevel semiotic means will carry a different meaning related to the other levels or inside regions and will lead to corresponding fuzzy semiotic descriptors and user-profile updates.

Thus, in FIG. 3, the multilevel semiotic means 110 indicates an interactivity opportunity or potential, inserted into the interactive main content 1, where the different levels of meaning of the multilevel semiotic means and the interactions with the user can be expressed in the fuzzy descriptor set module 200. The user is represented by the control device 2, used to address the multimedia system.

For the purpose of the invention, "interactivity potential" as in this preferred embodiment, could refer to "sponsored content" such as to an advert, to game, to an information about or related to a particular subject of the main content or to any sponsored or otherwise prompted or selected contents and combinations thereof. These "sponsored or otherwise prompted or selected contents" are inserted or telescoped into the main content in a suitable number and sequence, place or number of frames, as well known in the art in order to let the user know that there are interactivity potentials available as pre-determined principally by the providers of the content. The different levels of meaning are retained in meanings related to the multilevel semiotic sign 210, the content 220, the user 230 and Fuzzy pondering Factors 240 within the fuzzy descriptor set module 200.

The rules structuring the interactivity between the user and the system are programmed in the Content Inference Module

260. This first part of these rules relates to the multilevel semiotic sign 110 itself and its functions:

110: Multilevel semiotic means, which signals in this case an interactive advert opportunity, may appear for a duration of for example 30 seconds at a particular time within in linear interactive content 1, and may disappear if not addressed within that duration.

110*a*: Outside region of multilevel semiotic means: If addressed may provide information about type and sponsor of proposed content, such as "Interactive advert on new tire presented by tire manufacturer X", which may be shown as a message on a lower part of the display or transmitted by voice or other message as further conveyed by FIG. 5.

110*b*: First inside region of multilevel semiotic means. If addressed: 30-second advert, which may be shown as a PIP.

110*c*: Next inside region of multilevel semiotic means. If addressed: Info about sponsor, like SMS or URL address or clip, which may be shown as a PIP.

110*d* (not shown): Next inside region of multilevel semiotic means. If addressed: download test drive, product info, game and the like, leave main content or remain in PIP.

110*e* (not shown): Next inside region of multilevel semiotic means. If addressed directly, qualitative voting, betting, playing, selecting, searching, contact with sponsor via Internet server, videoconference and the like.

FIGS. 2*a* and 2*b* show multilevel semiotic means indicating the different levels. Of course, the means need not be a set of concentric circles, but could be any other suitable multilevel means, as mentioned above. In the case of the F1™ race in FIG. 3, a shape of a car could be shown, where the tires for example correspond to an interactive region like that described for the example of the nose of the dog in FIG. 2*b*. If a user starts interacting, and depending on the capabilities of the interactive services, the main content may be paused during the interaction, for example, while displaying an advertisement of the sponsor. After the ad, the main content may resume automatically. A new interactive opportunity may be displayed to further determine the interest of the user. For example, if the user does not interact further, the user-profile may be updated by adding new information in the corresponding fuzzy logic descriptor set, such as "user is not sufficiently interested for direct contact".

As shown in FIG. 3, Fuzzy descriptor set module 200 attributes membership functions to the user profile as he or she addresses the various interactive regions of multilevel semiotic sign 110:

110*a*: User not interested (if seen or heard information about type and sponsor of proposed content, but does not go further),

110*b*: User mildly interested (if selected to see the 30 second advert),

110*c*: User interested (if selected to see info about sponsor, like SMS or URL address or clip. The user profile could be pondered later, like as a function of the content of an SMS sent by the user at that level).

It is obvious that addressing further levels would lead to more differentiated and evolutionary profiles or membership functions like "User very interested" or "Qualified prospect".

Thanks to such user-profile updating, not only does a user avail of more specific interactive opportunities, which might be of a potentially higher interest to the user, but the company providing the interactive content could also evaluate the user-profile, one-by-one, or of several users together, to obtain information on the potential interest of users as a whole for the company's product. This would allow a company to more clearly target its potential audience, and thus avoid useless "bombarding" of users/viewers with advertisements, providing a more cost-effective interactive advertising or to increase the half-life of the interactive content, i.e., the time span during which such an interactive content like, for example, a game or a tutorial, remains interesting for users.

In the case explained above, the broadcaster, the main content provider and, by extension, the sponsoring content provider will know for example that user "X" did not watch the advert placed by a car tire manufacturer, sponsoring a car racing event, or that user "X" did not care for the documentary clip about the race track and region that the local municipality wanted to transmit. The system will classify user "X" as "not interested" in this particular sponsored content offered within this particular main content. The fuzzy logic system will use the term "not interested" as a linguistic variable for further processing.

From reading the description of this application, which could be mobile, web, ADSL or broadband based, and as shown in FIG. 3, it becomes clear how the multilevel semiotic user and metadata interface means 110 and the fuzzy logic descriptor set module 200 in the metadata logic layer 20 can become the basis for a cognitive adaptive multimedia expert system 250 according to the invention. The important new definition of "fuzzy semiotic" variables is indeed innovative compared to the "linguistic" variables and allows to use visual semiotics in the qualitative presentation, evaluation, appreciation and decision-making that happens between the viewer and the content.

The innovation also consists of using semiotic signs, for example, iconic, symbolic and indexical signs, as semiotic variables to the definition of fuzzy sets, which up to now used merely numerical and sometimes linguistic variables. Adding the dimension of differentiation between the "signifier," e.g., sound, image, word, movement and combinations thereof, and the "signified," e.g., concept or meaning that is supposed to be represented by or contained in the "signifier," greatly enhances the use of fuzzy logic systems in general and in particular through the input of external factors or indices of phenomena as "Fuzzy pondering factors" 240.

It is particularly effective in the realm of the disclosed inventive interactive multimedia system. The innovation leads to the notion of semiotic computing, computing with signs versus computing with words, as fuzzy logic has been sometimes semantically described. This notion will be explored in the following of the description of embodiments and figures.

Now that the simple, but in general, very representative application of interactive advertising has been explained, other applications will be explained using FIGS. 4 and 5. The performance of the inventive multilevel semiotic user interface with fuzzy descriptor sets will be shown in the realms of:

documentary content,
voting,
qualitative betting,
role playing,
random interactive gaming, and
semiotic multimedia organizer.

FIG. 4 shows the application of a simple indexical sign, concentric circles, in a fictive interactive documentary on the "Adventures with Bushi"©, Content 1, a travel diary of a little Japanese dog across the world, enhanced with cultural and practical information about the experiences lived and the places visited and their history as the story goes on. The backbone thus is the main story, Content 1, which in the case of FIG. 4 happens to be at the episode 1*a*, "Bushi in Brittany©". For illustration purposes, if we would watch episode 1*a*, at a particular instant or event, a multilevel interactivity semiotic sign 110 would appear. The user would have, like with the interactive advertising application described earlier, the choice to address it or not. But same as one rarely reads a lonely Planet™ travel guide in a linear fashion, at one point the invitation for interactivity will rouse sufficient curiosity, specially in the case of a documentary. As shown in FIG. 4, six different additional contents (contents 2, 3, 4, 5, 6, 7) can be accessed through the multilevel semiotic interface sign 110 in content 1, episode 1a. Each of these contents can again have multilevel semiotic interface signs (for example 210, 310, 410, 510, with individual levels) or not, as defined by the editorial choice for contents 6 and 7, which for the sake of the present description have been editorially selected to be closed end linear stories.

The fuzzy descriptor sets, as shown in FIGS. 2 and 3, will be established in a similar way. The person skilled in the art will readily recognize that specific membership functions and fuzzy descriptor sets like "most interested in beacons," or "no interest in legends," and "very interested in major locations," are possible and can contribute to establishing user profiles that are useful for the publishers, service providers and sponsors. It will also be evident to those familiar with the art that possibilities like identifying and interfacing to SMS and URL, downloads, MPEG, videoconference and the like, via the documentary application using the inventive multilevel semiotic user interface can enhance the benefits for the user and the publishers, providers and sponsors, same as shown previously in FIG. 3 for the interactive advertising application.

It will be easy to see that the more interactive oriented documentary application described in FIG. 4, which proposes short episodes with equally short but effective "interactivity clips," can function as a mobile, ADSL, web, broadband, download or plug-in application. The multilevel semiotic user and metadata interface with the fuzzy logic descriptor set can innovate the interactive rendering of the enormous amount of existing linear content from comics to documentaries to movies and other AV documents. Known contents can be used to link to other main or inserted content, thus allowing to avail of existing products.

FIG. 5 now introduces a multilevel semiotic user and metadata interface according to the invention, which uses a number of multilevel semiotic signs to facilitate applications where the user is asked to make choices, decisions, or define a choice for a character for role play. The chosen application refers to a game, a documentary, a sitcom, an event based series, and the like content 5, as shown in FIG. 5a. At one point during the example in content 5, an interactive game or docu-fiction, a multilevel semiotic sign 501 appears, in this case a travel bag, on the upper right hand side of the screen. As in the previous examples, it may be on screen for a predetermined amount of time and the user will be free to address it or not. If the user addresses the multilevel semiotic sign 501, a short textual or sounded message will appear as, for example, shown in FIG. 5a, giving information relating to the interactive episode available.

FIG. 5a shows as an example an interactive content called: "You just won a virtual trip to the Orinoco". If the user does nothing for a certain amount of time, for example 30 seconds, the multilevel semiotic sign 501 disappears and the main content 5 continues. If the user addresses the multilevel semiotic sign 501 within that certain amount of time, as shown in FIG. 5c, a screen showing a variety of objects, referenced 503, 504, 505, 506, 507, 508, 509, to be packed for the tour and a short instruction to pack the bag as the user sees fit. This could be introduced in PIP fashion or with a new background screen as shown in FIG. 5c, relating directly to the adventure.

Multilevel semiotic sign 501 now might appear a bit larger and show 4 regions including the region immediately outside as shown in FIG. 5b. In this example, the regions correspond to the degree of necessity that the user sees to pack the various objects, in this case ranging from "not necessary" to "vital" as shown in detail in FIG. 5b with regions 501a to 501d. The user can pack the bag by "dragging and dropping" each object into the particular region of the bag, according to his feelings, whether the particular object is "vital", "maybe necessary" or "not necessary" and so on depending on the choices provided. In an alternative embodiment, each object may itself be a multilevel semiotic sign, so that a user can address a level of the object, instead of dragging and dropping it. Each such level may represent an attribute or an importance of the object to the user or be in relation to a choice, a decision, a degree of importance, suspense, fun, courage and the like, as explained above.

It will be obvious from what was explained earlier that the fuzzy descriptor sets can be established for the "bag packing activity" as well as for the user. At the authoring stage, membership functions like "careless explorer" can be defined, for example, for the user who thinks that a vaccination and a water filter are "not necessary" and like "crazy explorer" if the user additionally considers the antidote for snake bites as "not necessary".

It will also be evident, as shown in FIG. 3, that a cognitive adaptive multimedia expert system 250 building on the applicable fuzzy descriptor sets that result from the users choices 230 and the application 210, 220, as well as some fuzzy pondering factors 240, like the time to pack or the sequence of objects packed, or the selected level of the multilevel object, and on user preference rules 260a established by the content inference module 260, can address a content resource and access module 300 to generate different episodes and outcomes for different players. In one type of episode, all the "crazy explorers" might die on this virtual Orinoco trip, in another all the "careless explorers" might just become sick. It will also be obvious for the person skilled in the art that the number of choices and resulting variations is very high and that the individual episode can be lived differently by different people and be lived differently a number of times by the same user.

In a preferred embodiment, as shown, the level of difficulty or suspense results from the user's choices and some fairly straightforward fuzzy pondering factors. In such a preferred embodiment and as shown in FIG. 5c, a second specific multilevel semiotic sign 502 is introduced, in this case concentric circles, to let the user chose a desired "level of adventure", which gives the possibility to complement the user related fuzzy descriptors as well as to modulate the generation of suspense, the direction and the outcome of the interactive episode. It is evident that the meaning of this second specific multilevel semiotic sign (502) can relate to surprise, danger, comfort, state of mind, physical conditions, mental preparedness, level of security and the like attributes and conditions and that the meaning can relate to the content as well as to the user or external factors.

In other preferred embodiments, the meaning of this second meaning specific multilevel semiotic sign 502 corresponds to the user and the role he or she wishes to play in a particular episode, like from "observer" to "active player" in a sports game, for example. In other preferred embodiments, an additional specific meaning attached to multilevel semiotic sign referenced 502a, (not shown), is used to increase the choices for the player to define approaches and attitudes. In other preferred embodiments, the meanings of this meaning specific multilevel semiotic signs 502 and 502a are used to express attitude, character or role aspects of the user and of at least a particular character in the game or tutorial who might be friend or foe or otherwise related to the user within the story.

In other preferred embodiments, the meanings of this meaning specific multilevel semiotic signs 502 and 502*a* are used to express as well attitude, character or role aspects of the user and at least a second player in the game or a negotiating tutorial who might be friend or foe or otherwise psychologically related to the user within the story. In other preferred embodiments, the random function generator (see FIG. 3, 260*b*) located in the cognitive adaptive multimedia expert system (FIG. 3, 250) can modify the behavior of the meaning specific multilevel semiotic sign related to the friend or foe character. The behavior could be influenced as compliant or in opposition with the original intended meaning of this meaning specific multilevel semiotic sign to create additional attraction and tension in the game.

In other preferred embodiments, objects, like objects 503, 504, 505, 506, 507, 508, 509 in FIG. 5*c*, or any other number of them and the corresponding multilevel semiotic signs correspond to search or selection criteria or objects. The main multilevel semiotic sign, like 501 in FIGS. 5*b* and 5*c*, corresponds to the search or selection objective and the meaning specific multilevel semiotic sign, or signs 502 and 502*a* correspond to degrees of certainty or other attitudinal factors relating to the user himself, or with regards to the content, the role to be played, the object or notion to be searched, and the like. In other preferred embodiments, objects, like objects 503, 504, 505, 506, 507, 508, 509 in FIG. 5*c*, or any other number of them and the corresponding multilevel semiotic signs correspond to betting criteria, persons, animals, teams, objects, outcomes and the like, on which qualitative bets are made. Horse racing, with individual signs for the horses, the jockeys, the race track and certain conditions like health, past performance, and the like, can be expressed by suitable multilevel semiotic signs.

It is evident to the person skilled in the art that these embodiments can relate to, but are not limited to, interactive searching and qualitative decision making content such as related to qualitative look-up, deciding, betting (not only number based), voting, selecting, playing, negotiating, and the like, and can be represented but are not limited by sports betting, event shows grading, qualitative "ratings", shopping, dating, tutorials, gaming, negotiating and documentary based learning, voting on AV clips, adverts, news, on choices of candidates, and the like. It will be equally evident to the person skilled in the art that the applications according to the embodiments can be stand-alone as well as interactive episodes and function in mobile, ADSL, broadband, iTV and web-based environments and combinations thereof.

In a particular preferred embodiment (not shown), objects, like objects 503, 504, 505, 506, 507, 508, 509 in FIG. 5*c*, or any other number of them and their multilevel semiotic signs, correspond actually to objects existing in the story and not only to separate semiotic representations of them. At a particular moment in the story, like planning the virtual trip to the Orinoco, the syringe for vaccination, the flask, the antidote and the other objects, as well as the travel bag, would actually be there in the particular scene. The bag would show a particular multilevel appearance, the objects could be placed in the regions of the bag, same as explained above, using the control device who functions as a "magical hand or wand" for the user. The fuzzy descriptor sets, "not necessary", "vital" and the like, relating to the importance of the objects and the ones like "crazy explorer" relating to the user will be developed exactly as described before for FIG. 5.

In another particular preferred embodiment (not shown), where the multilevel semiotic sign user interface has been downloaded to the control device as explained before for FIG. 3, the objects, like objects 503, 504, 505, 506, 507, 508, 509 in FIG. 5*c*, or any other number of them, correspond to personal multimedia content items. The objects can be represented by the multimedia content supplier logos like HBO™, CNN™, Sony™, EA™, and the like. The main multilevel semiotic sign, like 501 in FIGS. 5*b* and 5*c*, may correspond to the logo of the overall content supplier subscribed to. The levels of the main multilevel semiotic sign correspond to the degree of preference or other qualitative criteria of organizing the content. The objects are placed in the corresponding region. Addressing a region leads to displaying the content items placed there according to the particular degree of preference or other qualitative criteria attributed to them by the user.

The meaning specific multilevel semiotic sign or signs 502, as shown in FIG. 5, may correspond to particular users, where each user in a household, for example, has a proprietary region in the meaning specific multilevel semiotic sign or signs. By addressing the region, the preferential listing of that particular person may be displayed. A next meaning specific multilevel semiotic sign or signs 502*b* would correspond to preferred view timing slots or attitudinal factors relating to each of the users. The resulting fuzzy descriptor sets would mirror the situation correspondingly, for example: Dad, CNN Financial, 07.00 pm, workdays.

In another preferred embodiment, as indicated by FIG. 2*f*, the personal multimedia content organization can be stored in the control device or the STB, PC, Multimedia system, and the like, and transmitted to the overall content provider to facilitate communication with the user and personalized service. In another preferred embodiment, as indicated by FIG. 2*f*, the personal multimedia content organization can be stored in the control device or the STB, PC, Multimedia system, and the like, and be available solely for the user to organize all his multimedia items using the multilevel semiotic user interface means. Now that the interaction between the user and the novel interactive multilevel semiotic and fuzzy logic user and metadata interface has been described in various embodiments, it will be clear to the person skilled in the art that the invention is not limited to the description, but applies to a large number of further multimedia embodiments, applications and environments.

Part IV: —Structure of the Cognitive Adaptive Multimedia Expert System

As shown in FIG. 3, the cognitive adaptive multimedia expert system 250 consists at least of:
  (a) A content inference module 260 where the pre-programmed fuzzy descriptor sets belonging to the multilevel semiotic sign 210, to the content 220, and to the fuzzy pondering factors 240 are put into context with the real time user actions 230 and expressed as user preference rules 260*a* within the context of the application;
  (b) A random function generator 260*b* that can inject random behavior, character compliance or defiance, surprise or tension elements;
  (c) An adaptive expert system processor 270; and
  (d) A data evaluation module 280.

The adaptive expert system processor 270 is cognitive in nature, meaning it uses semiotic signs that constitute a large part of human cognition and knowledge representation in an innovative multilevel way, and which are translated directly into fuzzy logic descriptors again related to knowledge about linguistic description and interpretation of signs. It is further based on knowledge either pre-programmed, or acquired through user interaction, evolutionary, occurrence, preference or other logic building method based, stored and accumulated with repeated "experience" with the same user or several users. In some applications, neural networks may be created to provide the learning effect. In some applications like games, negotiating plays, and tutorials, the system can function as a cognitive psychology tool, by taking, for example, a certain attitude into consideration.

The system is adaptive in nature since it reacts with different outcomes to different user interaction, pondering factors and random input. The system can be structured as a learning system, progressing with the user and combining his results with his declared or perceived attitudinal approaches. Knowledge acquisition can happen, for example, through interaction and frequency analysis, weight assignment and generation of adapted fuzzy sets, after taking care of semantic unification of terms used. Knowledge can also evolve "genetically", for example, from a particular performance of the user to higher levels.

Since fuzzy descriptor sets are used to interface directly with the multilevel semiotic user interface, the system can be constructed as an evidential reasoning system, using evidential support logic, evolutionary algorithms and fuzzy sets as form of representation. Fuzzy membership functions and multilevel semiotic signs offer the additional advantage of readability for the novice as well as ease of definition of terms in the authoring stage.

Evidential logic in case-based conceptual reasoning is an alternative to the more complex deductive logic in AI (Artificial Intelligence) applications, without limiting the invention to the sole tool of evidential reasoning. Inferences can be combined from several rules as will be necessary with multi-player or active game character to user interaction.

The data evaluation module 280 processes data and files related to user, content, interactivity, content resource, preferences or results of qualitative voting, betting, selecting and the like. These data and files can be further treated off-line in the Content Evaluation Module 320. The module 320 can also accept suitably transcribed summary results of SMS or equivalent user communications relating to content appreciation or recommendation as indicated in FIG. 3.

FIG. 3 explains the individual system connections in a schematic way, the individual functions have been described previously in detail in the applications and embodiments. The overall system is embedded in the well-known multimedia metadata layer, shown for the purpose of the invention as consisting of a presentation layer 10, a logic layer 20 containing the cognitive adaptive multimedia expert system and a content layer 30. Whether these metadata are embedded in applications under MPEG 2, 4, 21, in an STB, or a multimedia system containing the same or a similar structure for interactive multimedia rendering and using, whether they are downloaded with or separate from the main the content, is not relevant to the invention. The complexity depends on the application. The multilevel semiotic and fuzzy logic user and metadata interface means for interactive multimedia system having cognitive adaptive capability, according to the invention, is simple enough to be built with standard tools as a flexible, high value middleware. Some applications, like converting linear comics to interactive comics, converting linear tutorials to interactive tutorials, or providing an interactive e-book over a web-service corresponding to a printed children's book, or to a plush character or animal can be very light indeed. Correspondingly, the system according to the invention can be light enough to be stored on a memory key and give access to web-based interactive versions, variants and sequels.

Having described several preferred embodiments of the invention, it goes without saying that, broadly, one aspect of the invention pertains to a multilevel semiotic and fuzzy logic user and metadata interface means that includes: (a) an interactive user interface means comprising at least one multilevel semiotic means addressable by a user and a fuzzy logic descriptor set module for storing multiple fuzzy logic descriptor sets, (b) wherein each fuzzy logic descriptor set is related to a respective level of each of the multilevel semiotic means and describe at least one level of significance of interactivity corresponding to the respective level of each of the multilevel semiotic means, wherein the level of significance is directly related to the importance of a level addressed and thus selected by the user of the multilevel semiotic means, wherein each fuzzy logic descriptor set defines at least one fuzzy semiotic membership function definable by and based on the addressing of a level of each of the multilevel semiotic means and at least one significance attributed to the level, (c) a metadata layer for linking the multilevel semiotic means to interactivity points present in the content of the multimedia representation and defined by the metadata layer such that each level of each of the multilevel semiotic means identifies an interactivity point in the content and allows by selection of the interactivity point to perform a selectively varying content manipulation and to receive a resulting interactive presentation of content according to the selection, and (d) a user control device for addressing the multilevel semiotic means. Having described several preferred embodiments of this invention, it will now be apparent to one of skill in the art that other embodiments incorporating its concept may be used. It is felt, therefore, that this invention should not be limited to the disclosed embodiments, but rather should be limited only by the scope of the appended claims.

The invention claimed is:

1. A multilevel semiotic and fuzzy logic user and metadata interface apparatus for varying content manipulation of an interactive multimedia representation in a multimedia system, wherein the multilevel semiotic and fuzzy logic user and metadata interface apparatus comprises:
   (a) an interactive user interface comprising
      i. one or more multilevel semiotic means addressable by a user, wherein the one or more multilevel semiotic means comprise an interactive content display; and
      ii. a fuzzy logic descriptor set module that stores multiple fuzzy logic descriptor sets,
   wherein each fuzzy logic descriptor set is related to a respective level of each of the multilevel semiotic means and describes at least one level of significance of interactivity corresponding to the respective level of each of the multilevel semiotic means, wherein the level of significance is directly related to the importance of a level addressed and thus selected by the user of the multilevel semiotic means,
   wherein each fuzzy logic descriptor set defines at least one fuzzy semiotic membership function definable by and based on addressing of a level of each of the multilevel semiotic means and at least one significance attributed to the level;
   (b) a metadata layer that links the one or more multilevel semiotic means to interactivity points present in the content of the interactive multimedia representation, wherein the interactivity points are defined by the metadata layer so that each level of each of the one or mores multilevel semiotic means identifies a first interactivity point in the content and allows, by selection of the first interactivity point, selectively varying of content manipulation and receipt of a resulting interactive presentation of content according to the selective varying of content manipulation; and (c) a user control device operably connected to address the one or more multilevel semiotic means.

2. A multilevel semiotic and fuzzy logic user and metadata interface apparatus according to claim 1, further comprising:

(d) a logic layer operably connected to store said fuzzy logic descriptor set module, and the logic layer further stores a user preference engine that defines a user profile based on the addressing of a user of a level of said multilevel semiotic means.

3. A multilevel semiotic and fuzzy logic user and metadata interface apparatus according to claim 2, wherein said logic layer further comprises a fuzzy pondering factor level comprising pondering factors, or random interjections expressed in fuzzy logic functions and applied to the interactive process between the user and the multimedia system.

4. A multilevel semiotic and fuzzy logic user and metadata interface apparatus according to claim 3, wherein said pondering factors are selected from the group consisting of time, duration of staying within the content of a multilevel semiotic means level, and sequence of addressing a multilevel semiotic means level.

5. A multilevel semiotic and fuzzy logic user and metadata interface apparatus according to claim 2, wherein said logic layer further comprises a cognitive adaptive multimedia expert system for evaluating said user profile.

6. A multilevel semiotic and fuzzy logic user and metadata interface apparatus according to claim 5, wherein said cognitive adaptive multimedia expert system comprises i. a content inference module where the pre-programmed fuzzy descriptor sets belonging to a multilevel semiotic sign, to the content, and to the fuzzy pondering factors, are put into context with real time user actions and are expressed as user preference rules within the context of an application;

ii. a random function generator that is capable of injecting random behavior, character compliance or defiance, surprise or tension elements;

iii. an adaptive expert system processor; and iv. a data evaluation module.

7. A multilevel semiotic and fuzzy logic user and metadata interface apparatus according to claim 6, wherein said multilevel semiotic sign includes, in one of the levels of said multilevel semiotic sign, an electronic address allowing a user to send immediately a voice, text, AV or combined message, preformatted or open, to the electronic address.

8. A multilevel semiotic and fuzzy logic user and metadata interface apparatus according to claim 7, wherein said electronic address corresponds to a Short Message Service, a Multimedia Message Service or other fixed and mobile communication address addressable by fixed and portable AV and text communication means.

9. A multilevel semiotic and fuzzy logic user and metadata interface apparatus means according to claim 8, wherein said other fixed and mobile communication address is an e-mail or a URL.

10. A multilevel semiotic and fuzzy logic user and metadata interface apparatus according to claim 7, wherein a content of said message is used as a pondering in the evaluation of the user.

11. A multilevel semiotic and fuzzy logic user and metadata interface apparatus according to claim 6, wherein said cognitive adaptive multimedia expert system further comprises a data evaluation module that processes data and files related to user, content, interactivity, content resource, preferences or results of qualitative voting, betting, and selecting.

12. A multilevel semiotic and fuzzy logic user and metadata interface apparatus according to claim 11, wherein said cognitive adaptive multimedia expert system further comprises a content evaluation module that provides further offline processing of said data and files processed by said data evaluation module.

13. A multilevel semiotic and fuzzy logic user and metadata interface apparatus according to claim 6, wherein a first multilevel semiotic means is provided, and once selected by said user control device, at least a second multilevel semiotic means and a number of other semiotic signs representing objects, items, situations, and characteristics are provided and are selectable by said user control device.

14. A multilevel semiotic and fuzzy logic user and metadata interface apparatus according to claim 13, wherein said number of other semiotic signs are also multilevel signs, where each respective level identifies an attribute of an item signified by the sign, an object, a character, a situation, and a characteristic.

15. A multilevel semiotic and fuzzy logic user and metadata interface apparatus according to claim 13, wherein said number of other semiotic signs correspond to actual objects existing in the content.

16. A multilevel semiotic and fuzzy logic user and metadata interface apparatus according to claim 13, wherein said cognitive adaptive multimedia expert system further comprises a content resource and access module that generate different episodes and outcomes as a function of selected objects.

17. A multilevel semiotic and fuzzy logic user and metadata interface apparatus according to claim 13, wherein objects are linked to said at least second multilevel semiotic means, as a function of which a corresponding fuzzy logic descriptor set is arranged to define a corresponding fuzzy semiotic membership function based on the selection and linkage of said objects between said first multilevel semiotic means and said at least second multilevel semiotic means.

18. A multilevel semiotic and fuzzy logic user and metadata interface apparatus according to claim 13, wherein said cognitive adaptive multimedia expert system is arranged to analyze said corresponding fuzzy descriptor sets that result from the users choices as well as one or more fuzzy pondering factors and user preference rules established by said content inference module so as to address a content resource and access module.

19. A multilevel semiotic and fuzzy logic user and metadata interface apparatus according to claim 13, wherein meanings of said second multilevel semiotic means relate to surprise, danger, comfort, state of mind, physical conditions, mental preparedness, and level of security and attributes and conditions, and wherein said meanings relate to the content as well as to the user or external factors.

20. A multilevel semiotic and fuzzy logic user and metadata interface apparatus according to claim 13, wherein meanings of said second multilevel semiotic means express attitude, character or role aspects of the user and at least a second player in the game.

21. A multilevel semiotic and fuzzy logic user and metadata interface apparatus according to claim 2, wherein said multilevel semiotic means is displayed for a predetermined period of time by the multimedia system, and during the predetermined period of time a user may address said multilevel semiotic means.

22. A multilevel semiotic and fuzzy logic user and metadata interface apparatus according to claim 21, wherein said user preference engine is arranged to update said user profile when no level is addressed within said predetermined period of time, or when a level is addressed.

23. A multilevel semiotic and fuzzy logic user and metadata interface apparatus according to claim 2, further comprising information output means operable so that said user profiles are readable externally.

24. A multilevel semiotic and fuzzy logic user and metadata interface apparatus according to claim 1, further comprising:
(d) a content layer operably connected to store a content resource and access module, and wherein said metadata layer maps said interactivity points to content resources stored in said content resource and access module.

25. A multilevel semiotic and fuzzy logic user and metadata interface apparatus according to claim 1, wherein each level of said multilevel semiotic means comprises one or more sub-levels addressable by the user.

26. A multilevel semiotic and fuzzy logic user and metadata interface apparatus according to claim 1, wherein said multilevel semiotic means is displayable in said interactive content.

27. A multilevel semiotic and fuzzy logic user and metadata interface apparatus according to claim 1, wherein said multilevel semiotic means is displayed on said user control device.

28. A multilevel semiotic and fuzzy logic user and metadata interface apparatus according to claim 27, wherein said multilevel semiotic means is downloadable onto said user control device by external communication means.

29. A multilevel semiotic and fuzzy logic user and metadata interface apparatus according to claim 1, wherein said multilevel semiotic means consists of a plurality of concentric circles, wherein each circle represents an addressable level.

30. A multilevel semiotic and fuzzy logic user and metadata interface apparatus according to claim 1, wherein said multilevel semiotic means consists of a plurality of similar shapes arranged as a Russian nesting doll, wherein each nested shape represents an addressable level.

31. A multilevel semiotic and fuzzy logic user and metadata interface apparatus according to claim 1, wherein said multilevel semiotic means is a sign selected from the group consisting of a semiotic iconic sign, a symbolic sign, and an indexical sign.

32. A multilevel semiotic and fuzzy logic user and metadata interface apparatus according to claim 1, wherein said multilevel semiotic and fuzzy logic user and metadata interface means is complemented by, or triggered by interactive exchange between user and application and between users via the application of images, music, sounds, vibrations, pressure, scents, imprints, temperature, breath, or a physicochemical expression of emotion.

33. A multilevel semiotic and fuzzy logic user and metadata interface apparatus according to claim 1, wherein said multilevel semiotic means is operable to communicate with the user in spoken or otherwise sound related fashion and wherein said user communicates with said multilevel semiotic means in spoken or otherwise sound related fashion.

34. A multilevel semiotic and fuzzy logic user and metadata interface apparatus according to claim 33, wherein certain spoken or otherwise sound related messages are linked to a particular level of the multilevel semiotic and fuzzy logic user and metadata interface means and to the corresponding fuzzy descriptor levels.

35. A multilevel semiotic and fuzzy logic user and metadata interface apparatus according to claim 1, wherein said multimedia representation is a documentary, a docu-fiction, or an interactive AV representation.

36. A multilevel semiotic and fuzzy logic user and metadata interface apparatus according to claim 1, wherein said multimedia representation is a game.

37. A multilevel semiotic and fuzzy logic user and metadata interface apparatus according to claim 36, wherein said game is a multiplayer game having a first player that is the user of said user control device, and said game has a second player that is virtual.

38. A multilevel semiotic and fuzzy logic user and metadata interface apparatus according to claim 36, wherein said game is a multiplayer game having a first player that is the user of said user control device, and said game has a second player that is a second user.

39. A multilevel semiotic and fuzzy logic user and metadata interface apparatus according to claim 1, wherein the user control device is a device selected from the group consisting of a remote control, a joystick, a mouse, and a keyboard.

40. A multilevel semiotic and fuzzy logic user and metadata interface apparatus according to claim 1, wherein the user control device is a PDA.

41. A multimedia system comprising a multilevel semiotic and fuzzy logic user and metadata interface apparatus operable to vary content manipulation of an interactive multimedia representation in the multimedia system, wherein the multilevel semiotic and fuzzy logic user and metadata interface apparatus comprises:
(a) an interactive user interface comprising
  i. one or more multilevel semiotic means addressable by a user, wherein the one or more multilevel semiotic means comprise an interactive content display; and
  ii. a fuzzy logic descriptor set module that stores multiple fuzzy logic descriptor sets,
wherein each fuzzy logic descriptor set is related to a respective level of each of the multilevel semiotic means and describes at least one level of significance of interactivity corresponding to the respective level of each of the multilevel semiotic means, wherein the level of significance is directly related to the importance of a level addressed and thus selected by the user of the multilevel semiotic means,
wherein each fuzzy logic descriptor set defines at least one fuzzy semiotic membership function definable by and based on addressing of a level of each of the multilevel semiotic means and at least one significance attributed to the level;
(b) a metadata layer that links the one or more multilevel semiotic means to interactivity points present in the content of the interactive multimedia representation, wherein the interactivity points are defined by the metadata layer so that each level of each of the one or more multilevel semiotic means identifies a first interactivity point in the content and allows, by selection of the first interactivity point, selectively varying of content manipulation and receipt of a resulting interactive presentation of content according to the selective varying of content manipulation; and
(c) a user control device operably connected to address the one or more multilevel semiotic means.

42. A multimedia system according to claim 41, wherein the user control device of the multilevel semiotic and fuzzy logic user and metadata interface apparatus is a device selected from the group consisting of a remote control, a joystick, a mouse, and a keyboard.

43. A multimedia system according to claim 41, wherein the user control device of the multilevel semiotic and fuzzy logic user and metadata interface apparatus is a PDA.

44. A multimedia system according to claim 41, wherein the system is an interactive system.

45. A multimedia system according to claim 44, wherein the interactive system is a computer.

46. A multimedia system according to claim 41, wherein the system is a interactive system having a cognitive adaptive capability.

47. A multimedia system according to claim 46, wherein the cognitive adaptive capability includes artificial intelligence.

* * * * *